(12) United States Patent
Hirakata et al.

(10) Patent No.: US 8,830,424 B2
(45) Date of Patent: Sep. 9, 2014

(54) LIQUID CRYSTAL DISPLAY DEVICE HAVING LIGHT-CONDENSING MEANS

(75) Inventors: Yoshiharu Hirakata, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 301 days.

(21) Appl. No.: 13/025,461

(22) Filed: Feb. 11, 2011

(65) Prior Publication Data

US 2011/0205468 A1 Aug. 25, 2011

(30) Foreign Application Priority Data

Feb. 19, 2010 (JP) ................................. 2010-035266

(51) Int. Cl.
*G02F 1/1335* (2006.01)
*G02F 1/136* (2006.01)

(52) U.S. Cl.
CPC ................................... *G02F 1/1335* (2013.01)
USPC ................ 349/95; 349/43; 349/106; 349/114

(58) Field of Classification Search
USPC ........ 349/95, 42, 43, 106, 107, 113, 114, 187
See application file for complete search history.

(56) References Cited

U.S. PATENT DOCUMENTS

| | | | |
|---|---|---|---|
| 5,808,712 A * | 9/1998 | Hishida et al. .................. | 349/95 |
| 6,384,886 B2 | 5/2002 | Yamazaki et al. | |
| 6,650,481 B2 * | 11/2003 | Osawa et al. .................. | 359/619 |
| 6,727,965 B1 * | 4/2004 | Kubota ......................... | 349/113 |
| 6,819,378 B2 | 11/2004 | Yamazaki et al. | |
| 6,956,632 B2 * | 10/2005 | Ozawa et al. .................. | 349/114 |
| 7,242,449 B1 | 7/2007 | Yamazaki et al. | |
| 7,443,464 B2 * | 10/2008 | Sekiguchi ..................... | 349/96 |
| 7,495,725 B2 * | 2/2009 | Kim et al. ..................... | 349/114 |
| 7,612,849 B2 | 11/2009 | Eguchi et al. | |
| 7,646,452 B2 | 1/2010 | Nakanishi et al. | |
| 2004/0041965 A1 * | 3/2004 | Liu .............................. | 349/113 |
| 2008/0042926 A1 | 2/2008 | Egi et al. | |
| 2009/0066880 A1 * | 3/2009 | Sugita et al. .................. | 349/64 |
| 2009/0279026 A1 * | 11/2009 | Okabe et al. .................. | 349/114 |
| 2011/0157252 A1 | 6/2011 | Yamazaki et al. | |
| 2011/0210332 A1 | 9/2011 | Jintyou et al. | |

FOREIGN PATENT DOCUMENTS

| JP | 2000-002875 | 1/2000 |
|---|---|---|
| JP | 2005-196139 | 7/2005 |

* cited by examiner

*Primary Examiner* — Lucy Chien
*Assistant Examiner* — Paisley L Arendt
(74) *Attorney, Agent, or Firm* — Nixon Peabody LLP; Jeffrey L. Costellia

(57) ABSTRACT

A light-condensing means and a pixel electrode may be formed on the same surface side of a substrate, and a region transmitting visible light in the pixel electrode may be provided so as to overlap with an optical axis of the light-condensing means. An anisotropic light-condensing means having a condensing direction X and a non-condensing direction Y may be used, and the light-condensing means may be provided so that the non-condensing direction Y corresponds to a longitudinal direction of the region transmitting visible light in the pixel electrode.

16 Claims, 20 Drawing Sheets

LIQUID CRYSTAL DISPLAY DEVICE HAVING LIGHT-CONDENSING MEANS

BACKGROUND OF THE INVENTION

1. Field of the Invention

The present invention relates to a liquid crystal display device in which a pixel portion includes a reflective electrode and a transmissive electrode.

2. Description of the Related Art

With the development of the information society, portable information devices such as phones, computers, and digital cameras have been widely used. There are limitations on weight and volume of a portable information device so that the information device can be carried. In particular, the proportion of weight and volume of a battery is high in an information device; thus, the capacity of the battery is limited.

In order to provide a portable information device that can be used for a long time with use of a battery with limited capacity, it is necessary to use components and devices with less power consumption for the portable information device. As an example of the display device with less power consumption, a reflective liquid crystal display device can be given.

A reflective liquid crystal display device has a structure in which a liquid crystal layer is interposed between a transmissive electrode transmitting visible light and a reflective electrode reflecting visible light. In the reflective liquid crystal display device, light which enters the display device from the transmissive electrode side through a film having a polarizing function or the like and is reflected by the reflective electrode is modulated by the liquid crystal layer, so that images are displayed.

Since in the reflective liquid crystal display device, a backlight is not used and display is seen by utilization of external light, power consumption is low. As an example of the reflective liquid crystal display device, a display device in which a reflective electrode is provided with a texture structure formed including a material with a low refractive index and a light-reflecting film formed including a material with a high refractive index is formed thereover has been devised (see Patent Document 1).

However, in the reflective liquid crystal display device, the display is difficult to recognize in some cases in an environment where the amount of external light is small. In view of the above, a so-called semi-transmissive liquid crystal display device has been devised, in which a pixel electrode includes a transmissive electrode and a reflective electrode and which is used as a reflective liquid crystal display device in an environment where sufficient external light can be obtained and used as a transmissive liquid crystal display device using a backlight in an environment where sufficient external light can not be obtained.

However, in the semi-transmissive liquid crystal display device provided with a reflective electrode and a transmissive electrode, the area which reflects external light is smaller as compared with a reflective liquid crystal display device including a pixel electrode provided with only a reflective electrode, and the area which transmits light from a backlight is smaller as compared with a transmissive liquid crystal display device including a pixel electrode provided with only a transmissive electrode. Accordingly, it has a problem in that display is dark.

In order to solve the above problem, a liquid crystal display panel in which a microlens is provided on a surface on the light incidence side has been proposed. In particular, a method is devised in Patent Document 2, in which a microlens is provided by irradiating a photocurable material layer formed on a surface on the light incidence side with light through a liquid crystal display panel so that misalignment is not caused between the microlens and a pixel.

REFERENCE

Patent Document

[Patent Document 1] Japanese Published Patent Application No. 2000-2875
[Patent Document 2] Japanese Published Patent Application No. 2005-196139

SUMMARY OF THE INVENTION

In the case where a microlens is provided on a surface of a liquid crystal display panel on a side where light from a backlight enters, the surface on which the microlens is formed does not correspond to a surface on which a pixel electrode is formed. Accordingly, special contrivance is needed in order to provide the microlens and a pixel without causing misalignment. The following method can be given as an example: a liquid crystal display panel including a liquid crystal layer and a color filter is provided between a substrate provided with a pixel electrode and a counter substrate facing the substrate, and then a photocurable material layer formed on a surface on the light incidence side is irradiated with light through the color filter, so that a microlens is formed. In such a method, steps are extremely complicated, and since the photocurable material layer is irradiated with light through the color filter, there are also problems of decrease in light-exposure efficiency and deterioration of the color filter.

In addition, when the proportion of a region transmitting visible light to the pixel electrode is low, the region transmitting visible light is difficult to align with an optical axis of the microlens, and variation in luminance among the pixels is likely to be caused. Further, intervals between transmitted beams vary, whereby a problem is caused in that display quality is decreased.

The present invention is made in view of the foregoing technical background. Accordingly, it is an object of the present invention to provide a liquid crystal display device in which a region transmitting visible light in a pixel electrode is provided on an optical axis of a light-condensing means which collects light from a back surface of a display panel without need for complicated steps.

Further, it is an object to provide a liquid crystal display device provided with a light-condensing means whose optical axis is easily aligned with a region transmitting visible light in a pixel electrode even when the proportion of the region transmitting visible light to the pixel electrode is low.

In order to achieve the above object, a light-condensing means and a pixel electrode may be provided on the same surface side of a substrate and a region transmitting visible light in the pixel electrode may be provided to overlap with an optical axis of the light-condensing means. An anisotropic light-condensing means having a condensing direction X and a non-condensing direction Y may be used, and the light-condensing means may be provided so that the non-condensing direction Y corresponds to a longitudinal direction of the region transmitting visible light in the pixel electrode.

One embodiment of the present invention is a liquid crystal display device including a pixel in which an anisotropic light-condensing means having a condensing direction X and a non-condensing direction Y and a pixel electrode for controlling alignment of liquid crystal are provided on the same surface side of a substrate. The anisotropic light-condensing means is provided over a region transmitting visible light in the substrate. The pixel electrode includes a region transmitting visible light and a region reflecting visible light, and the region transmitting visible light in the pixel electrode is provided over and to overlap with the anisotropic light-condensing means.

One embodiment of the present invention is the above liquid crystal display device in which more than one of the anisotropic light-condensing means are provided in the condensing direction X.

One embodiment of the present invention is a liquid crystal display device including a sub-pixel in which an anisotropic light-condensing means having a condensing direction X and a non-condensing direction Y and a pixel electrode for controlling alignment of liquid crystal are provided on the same surface side of a substrate. The anisotropic light-condensing means is provided over a region transmitting visible light in the substrate. The pixel electrode includes a region transmitting visible light and a region reflecting visible light. The region transmitting visible light in the pixel electrode is provided over and to overlap with the anisotropic light-condensing means. More than one of the sub-pixels are provided in the condensing direction X of the anisotropic light-condensing means.

One embodiment of the present invention is the above liquid crystal display device in which the non-condensing direction Y of the anisotropic light-condensing means corresponds to a longitudinal direction of the region transmitting visible light in the pixel electrode.

One embodiment of the present invention is the above liquid crystal display device in which in the anisotropic light-condensing means, inclined surfaces facing each other of a structure transmitting visible light are each provided with a reflective layer, and an angle θT formed by one inclined surface and the other inclined surface of the inclined surfaces facing each other is less than 90°.

One embodiment of the present invention is the above liquid crystal display device in which the anisotropic light-condensing means is a lenticular lens.

Note that a light-emitting device in this specification means an image display device, a light-emitting device, or a light source (including a lighting device). In addition, the light-emitting device includes any of the following modules in its category: a module in which a connector such as an FPC (flexible printed circuit), a TAB (tape automated bonding) tape, or a TCP (tape carrier package) is attached to a light-emitting device; a module having a TAB tape or a TCP provided with a printed wiring board at the end thereof; and a module having an IC (integrated circuit) directly mounted over a substrate over which a light-emitting element is formed by a COG (chip on glass) method.

According to the present invention, a liquid crystal display device in which a region transmitting visible light in a pixel electrode is provided on an optical axis of a means which collects light from a back surface of a display panel can be provided without need for complicated steps. Further, a liquid crystal display device provided with a light-condensing means whose optical axis is easily aligned with a region transmitting visible light in a pixel electrode even when the proportion of the region transmitting visible light to the pixel electrode is low can be provided.

DETAILED DESCRIPTION OF THE INVENTION

Figure 1:
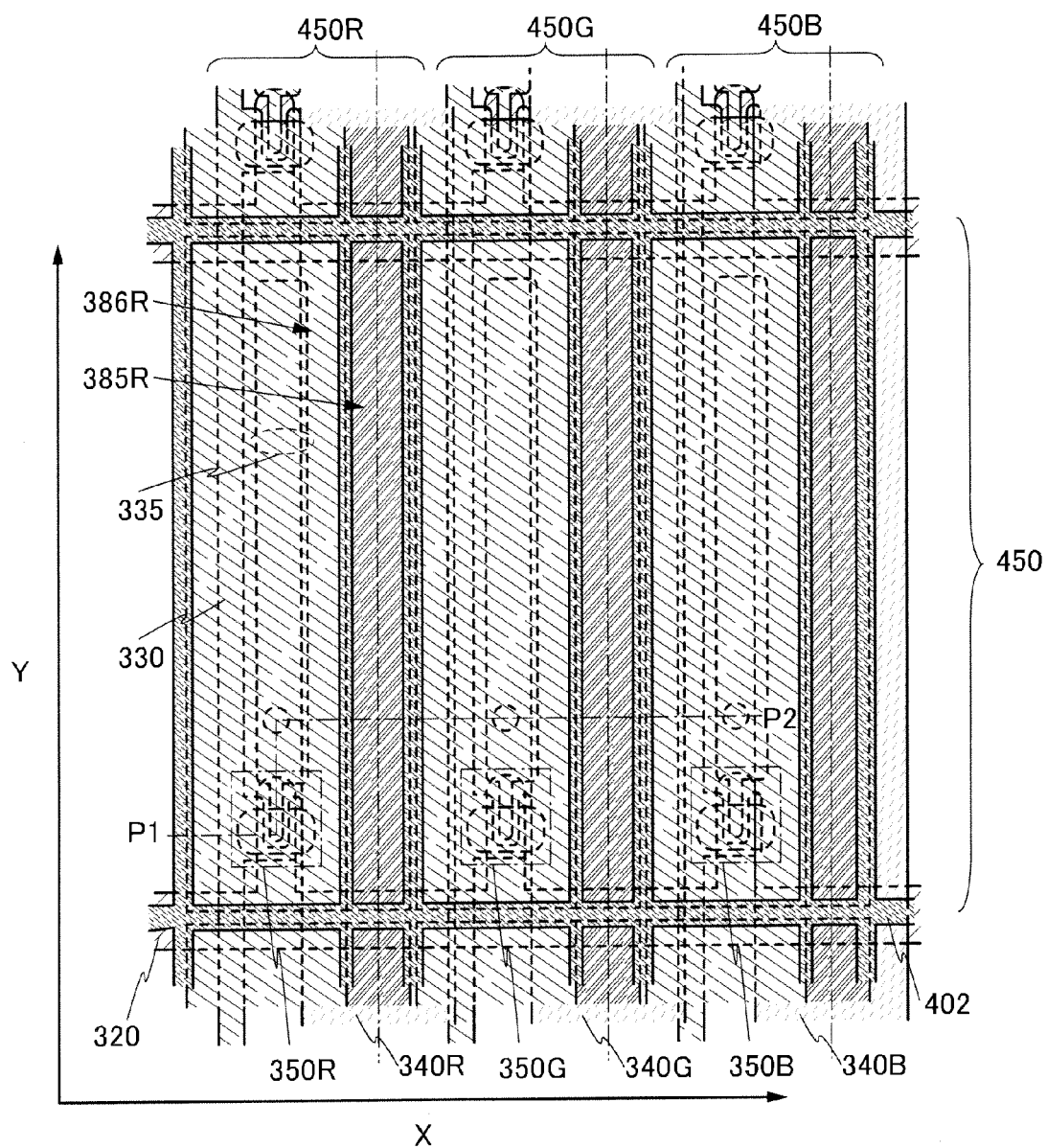
FIG. 1 illustrates an example of a pixel structure of a liquid crystal display device according to an embodiment.

Embodiments will be described in detail with reference to the accompanying drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a liquid crystal display device including a pixel electrode including region transmitting visible light and a region reflecting visible light, in which an anisotropic light-condensing means having a condensing direction X and a non-condensing direction Y is provided on the same surface side of the same substrate as the pixel electrode so as to overlap with the region transmitting visible light in the pixel electrode, will be described with reference to FIG. 1 and FIG. 2.

A structure of a pixel 450 of the liquid crystal display device described in this embodiment is described with reference to a top view illustrated in FIG. 1. The pixel 450 includes three sub-pixels: a first sub-pixel 450R, a second sub-pixel 450G, and a third sub-pixel 450B. The first sub-pixel 450R includes a first pixel electrode 315R transmitting visible light and a second pixel electrode 316R reflecting visible light (see FIG. 2). In this embodiment, transistors (350R, 350G, and 350B) are formed in the respective sub-pixels as switching elements.

Wirings connected to the transistors provided in the sub-pixels are described using the transistor 350R as an example. A gate electrode of the transistor 350R is connected to a scan signal line 320, one of a source electrode and a drain electrode thereof is connected to a data signal line 330, and the other thereof is connected to a capacitor line 335.

A stacked structure of the pixel 450 is described with reference to FIG. 2. FIG. 2 corresponds to a cross section taken along line P1-P2 in FIG. 1. The pixel 450 has a structure in which a liquid crystal layer 440 is interposed between an active matrix substrate 380 provided with a pixel electrode, an anisotropic light-condensing means, and a switching element and a counter substrate 430. Note that a spacer not illustrated is provided to maintain an interval (a cell gap) between the active matrix substrate 380 and the counter substrate 430.

The counter substrate 430 includes a counter electrode 401, a black matrix 402 over the counter electrode 401, and an alignment film 403 covering the black matrix 402, over a substrate 400.

The liquid crystal layer 440 is provided between and in contact with the alignment film 403 of the counter substrate 430 and an alignment film 319 of the active matrix substrate 380.

The active matrix substrate 380 includes a plurality of pixels. Further, each pixel can be provided with a plurality of sub-pixels. In this embodiment, a structure in which each pixel is provided with three sub-pixels is described as an example.

The sub-pixels (450R, 450G and 450B) each include an anisotropic light-condensing means, a pixel electrode, and a transistor electrically connected to the pixel electrode. The anisotropic light-condensing means, the pixel electrode, and the transistor are provided over the same surface of a substrate 300 having an insulating surface.

A structure of the active matrix substrate 380 in the vicinity of the sub-pixel 450R is described. The active matrix substrate 380 includes wirings including the data signal line 330, the capacitor line 335, and the scan signal line not illustrated, the transistor 350R, and a region 384R transmitting visible light, over the substrate 300 having an insulating surface. In addition, the active matrix substrate 380 includes the pixel electrode (315R and 316R) electrically connected to the transistor 350R, and the pixel electrode includes a region 385R transmitting visible light and a region 386R reflecting visible light.

An anisotropic light-condensing means 340R and the region 385R transmitting visible light in the pixel electrode may be included over and to overlap with the region 384R transmitting visible light, and a coloring layer 309R functioning as a color filter may be provided between the anisotropic light-condensing means 340R and the region 385R transmitting visible light in the pixel electrode.

Next, a main structure of the liquid crystal display device described in this embodiment will be described in detail using a structure in the vicinity of the sub-pixel 450R.

The pixel electrode (315R and 316R) controls an alignment state of liquid crystal by using an electric field generated between the pixel electrode and the counter electrode 401. The first pixel electrode 315R is formed using a conductive film transmitting visible light, and the second pixel electrode 316R is formed using a conductive film reflecting visible light. The region 385R transmitting visible light in the pixel electrode is formed using the first pixel electrode 315R, and the region 386R reflecting visible light in the pixel electrode is formed using the second pixel electrode 316R.

The region 386R reflecting visible light in the pixel electrode is provided over an insulating layer 311 having an irregular, uneven structure or a texture structure on its surface. The texture structure of the insulating layer 311 is reflected on surfaces of the first pixel electrode 315R and the second pixel electrode 316R, and light incident on the surfaces of those pixel electrodes is reflected diffusely, whereby the region 386R reflecting visible light in the pixel electrode is perceived to be substantially white macroscopically. When alignment of liquid crystal is controlled by using a pixel electrode which is perceived to be white, an easily viewable display like text on paper can be obtained.

The surface of the insulating layer 311 is provided with an uneven structure. The thickness of the insulating layer 311 is large in the region 386R reflecting visible light in the pixel electrode and small in the region 385R transmitting visible light in the pixel electrode. The thickness of the insulating layer 311 is changed in order to control the distance between the pixel electrode and the counter electrode, a so-called cell gap, so that the region 386R reflecting visible light in the pixel electrode is optimized for a reflective liquid crystal display region and the region 385R transmitting visible light in the pixel electrode is optimized for a transmissive liquid crystal display region.

The black matrix 402 of the counter substrate 430 is positioned to overlap with a boundary between the region 386R reflecting visible light in the pixel electrode and the region 385R transmitting visible light in the pixel electrode and boundaries between adjacent pixels or sub-pixels. When the black matrix 402 is provided, influence on display quality of alignment disorder of liquid crystal which is caused at a boundary where the cell gap changes and at a boundary between adjacent pixel electrodes having different potentials can be reduced.

An overcoat layer 310 covers the coloring layer 309R and serves as a base film for the insulating layer 311. By formation of the overcoat layer, part of a material included in the color filter can be prevented from entering a liquid crystal material. For the overcoat layer, a thermosetting material containing acrylic resin as a base is used. Alternatively, an inorganic material or a stack of an inorganic material and an organic resin may be used.

The coloring layer 309R can be provided so as to overlap with the region 385R transmitting visible light in the pixel electrode, so that the color filter can be formed. The coloring layer may be formed of materials exhibiting red (R), green (G), and blue (B), for example, when the liquid crystal display device performs full color display with use of the color filter. When the liquid crystal display device performs monochrome display, the coloring layer may be omitted or formed of a material exhibiting at least one color. Note that the color filter is not always provided in the case where light-emitting diodes (LEDs) of RGB or the like are arranged in a backlight unit and a successive additive color mixing method (a field sequential method) in which color display is performed by time division is employed.

An insulating layer 308 is provided between the coloring layer 309R and the substrate 300 so as to cover the anisotropic light-condensing means 340R. The insulating layer 308 transmits visible light, and its refractive index is lower than that of the anisotropic light-condensing means. It is preferable that the difference therebetween is as large as possible. Specifically, a material is selected, such that the difference between the refractive index of the material and that of the anisotropic light-condensing means is 0.1 or more.

The anisotropic light-condensing means 340R has anisotropy in its condensing direction. For example, the anisotropic light-condensing means 340R illustrated in FIG. 2 condenses light incident through the substrate 300 in a condensing direction X (a horizontal direction in the drawing) and does not condense the light in a non-condensing direction Y (a depth direction in the drawing). As an example of such an anisotropic light-condensing means 340R, a lenticular lens can be given. It is particularly preferable that the non-condensing direction Y of the anisotropic light-condensing means correspond to a longitudinal direction of the region transmitting visible light in the pixel electrode.

Figure 3:
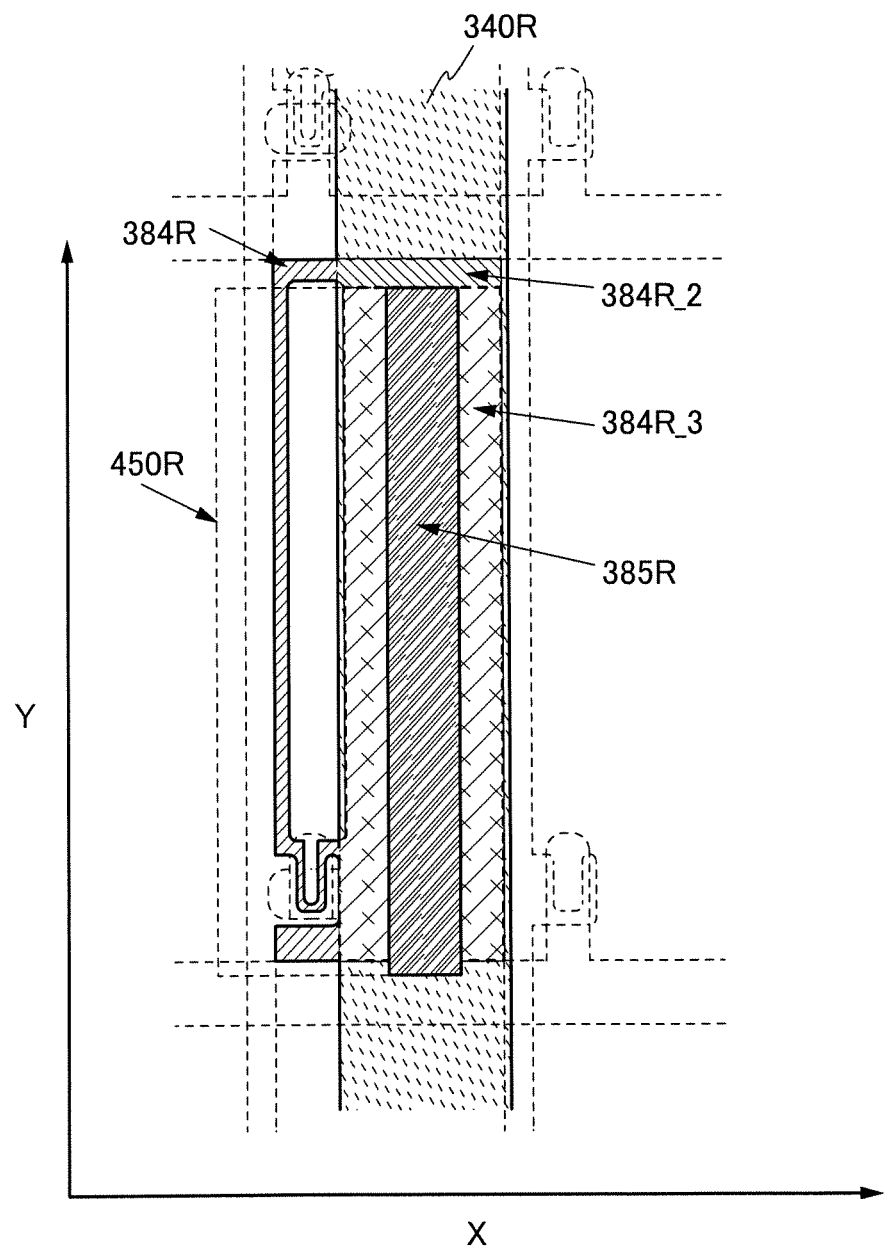
FIG. 3 illustrates an example of a pixel structure of a liquid crystal display device according to an embodiment.

The positions and sizes of the anisotropic light-condensing means 340R, the region 384R transmitting visible light in the substrate 300, and the region 385R transmitting visible light in the pixel electrode are described with reference to FIG. 3. The anisotropic light-condensing means 340R is provided so that at least a part thereof overlaps with the region 384R transmitting visible light in the substrate 300. When a region where the region 384R transmitting visible light in the substrate 300 overlaps with the anisotropic light-condensing means 340R is referred to as a light receiving region 384R_2, a region where the light receiving region 384R_2 overlaps with the region 385R transmitting visible light in the pixel electrode and a region where a region obtained by extending the overlapping region in the condensing direction X overlaps with the light receiving region are added to be an effective region 384R_3 of the light-condensing means. The area of the effective region 384R_3 is made larger than that of the region 385R transmitting visible light in the pixel electrode. It is preferable that the light receiving region 384R_2 and the region 385R transmitting visible light in the pixel electrode be as large as possible in the non-condensing direction Y in the pixel or the sub-pixel. As the proportion of each of the light receiving region 384R_2 and the region 385R transmitting visible light in the pixel electrode to the non-condensing direction Y increases in the pixel or the sub-pixel, light condensed in the condensing direction X is displayed as a line more than a dot, whereby light-condensing efficiency is increased and display quality is improved.

Note that in the case where the pixel 450 includes a plurality of sub-pixels, the non-condensing direction Y of the anisotropic light-condensing means preferably does not cross the sub-pixels. In other words, the non-condensing direction Y of the anisotropic light-condensing means does not correspond to a direction crossing the plurality of sub-pixels provided in the pixel 450. This is so that, since the black matrix 402 of the counter substrate is positioned at the boundaries between adjacent sub-pixels, part of the light condensed by the anisotropic light-condensing means is prevented from being blocked by the black matrix 402.

Figure 4A:
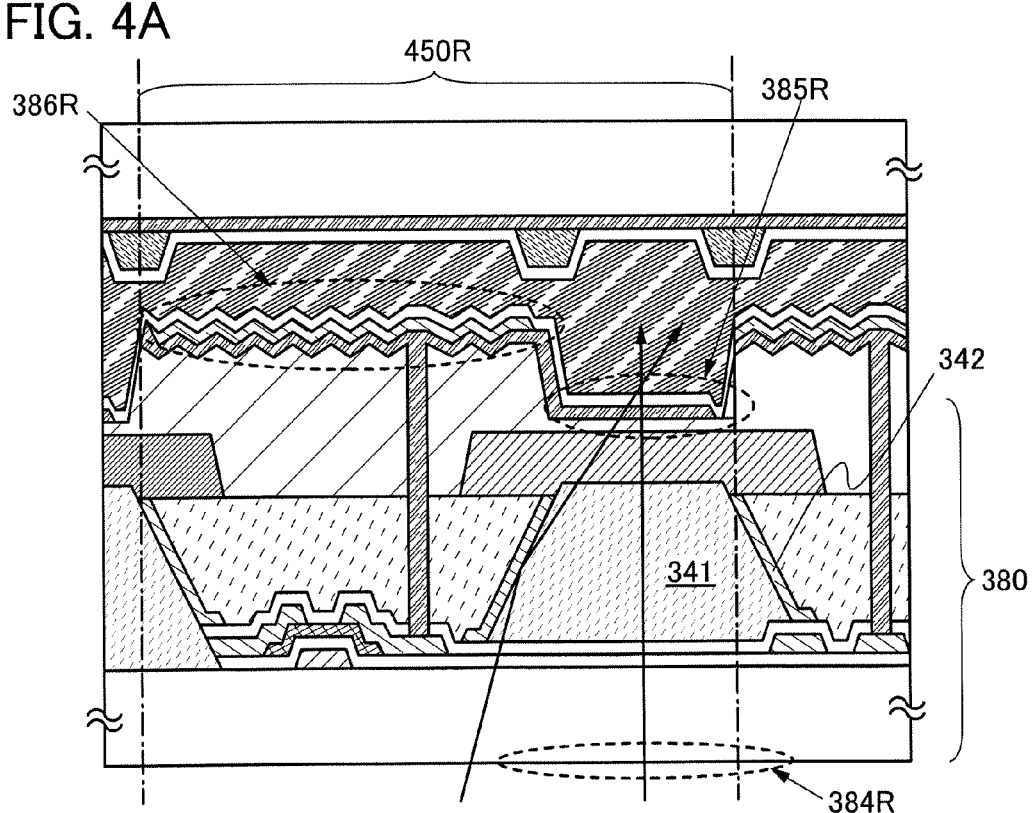
FIGS. 4A to 4C illustrate an example of a pixel structure of a liquid crystal display device according to an embodiment.
Figure 4B:
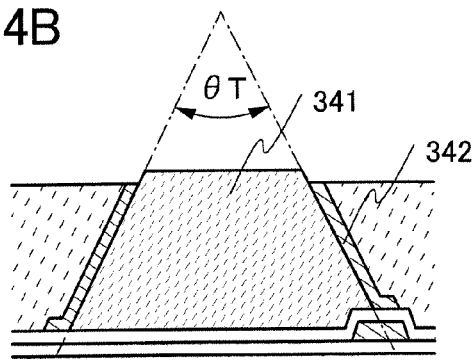
Figure 4C:
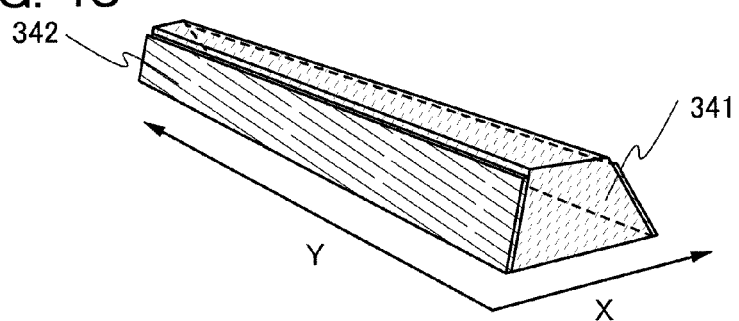

Another mode of an anisotropic light-condensing means is illustrated in FIGS. 4A to 4C. The anisotropic light-condensing means includes a structure 341 transmitting visible light and reflective layers 342 reflecting visible light along its ridgeline portions. Light from a backlight enters from the region 384R transmitting visible light in the active matrix substrate 380, and is reflected by the reflective layers 342 to be transmitted to a viewer side through the region 385R transmitting visible light in the pixel electrode (see FIG. 4A).

A cross section of the structure 341 of the anisotropic light-condensing means in a condensing direction X is illustrated in FIG. 4B. When side surfaces on right and left facing each other are inclined surfaces and the angle θT formed by the side surfaces is less than 90°, preferably greater than or equal to 10° and less than or equal to 60°, transmitted light from the region 384R where light from the backlight enters can be guided efficiently to the region 385R transmitting visible light in the pixel electrode. A mode of the anisotropic light-condensing means in a non-condensing direction Y is illustrated in FIG. 4C.

In a conventional semi-transmissive liquid crystal display device, when the area of the region 386R reflecting visible light in the pixel electrode is SR and the area of the region 385R transmitting visible light in the pixel electrode is ST, the proportion of the total area of both electrodes is 100% (SR+ST=100%). In a semi-transmissive liquid crystal display device having a pixel structure described in this embodiment, since the electrode area ST functioning as a transmissive electrode corresponds to the area of the region 384R where light from the backlight enters, the amount of transmitted light can be increased without increasing the area of the region 385R transmitting visible light in the pixel electrode or the luminance of the backlight. In other words, the total area of both electrodes in appearance can be 100% or more (SR+ST is 100% or more).

Figure 2:
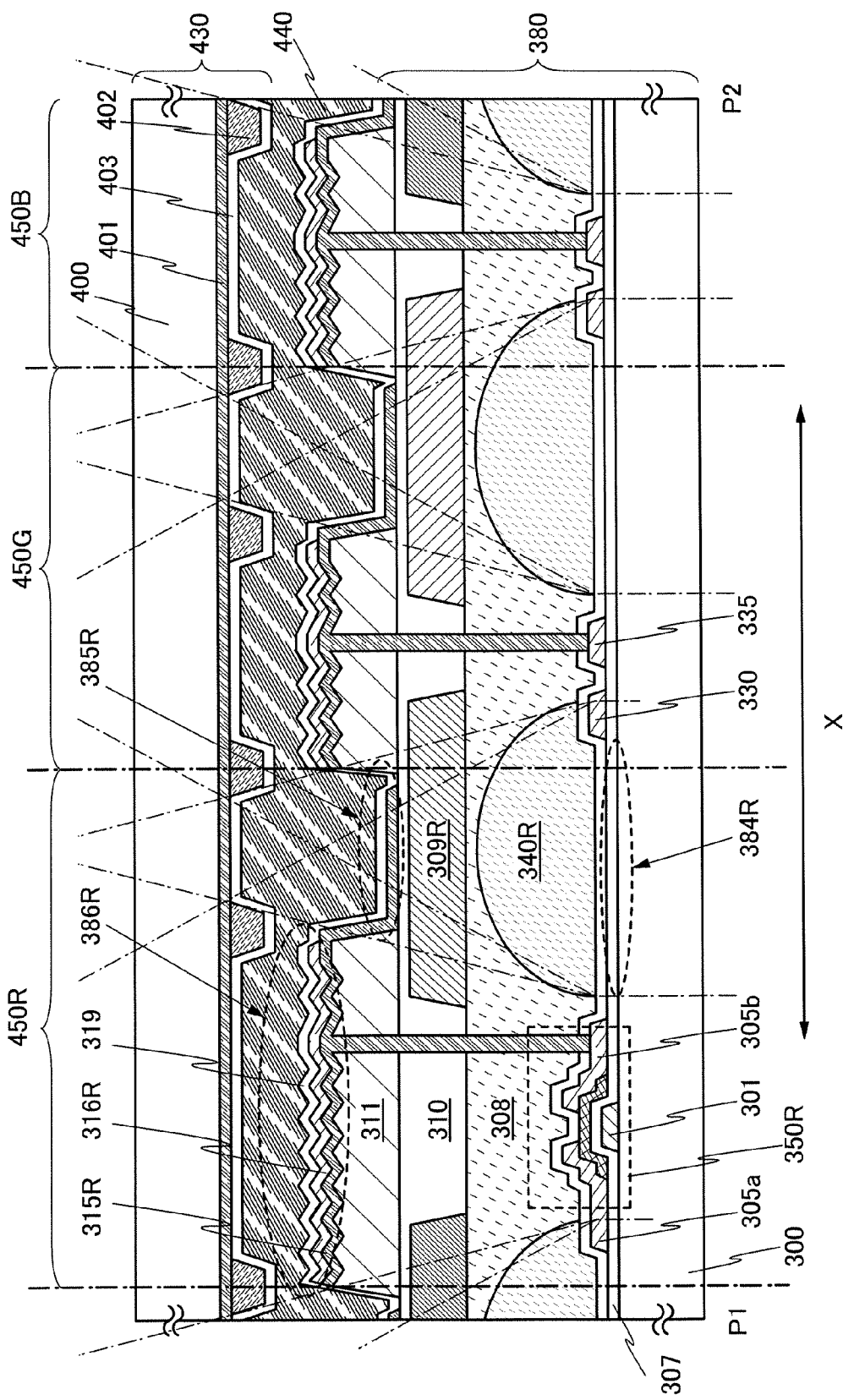
FIG. 2 illustrates an example of a pixel structure of a liquid crystal display device according to an embodiment.

As a switching element, for example, the transistor 350R can be used (see FIG. 2). The transistor 350R is formed over the substrate 300, including a gate electrode 301 and source and drain electrodes (305a and 305b). The first pixel electrode 315R is electrically connected to the source or drain electrode 305b of the transistor 350R, through an opening formed in an insulating layer 307, the insulating layer 308, the overcoat layer 310, and the insulating layer 311.

Figure 5:
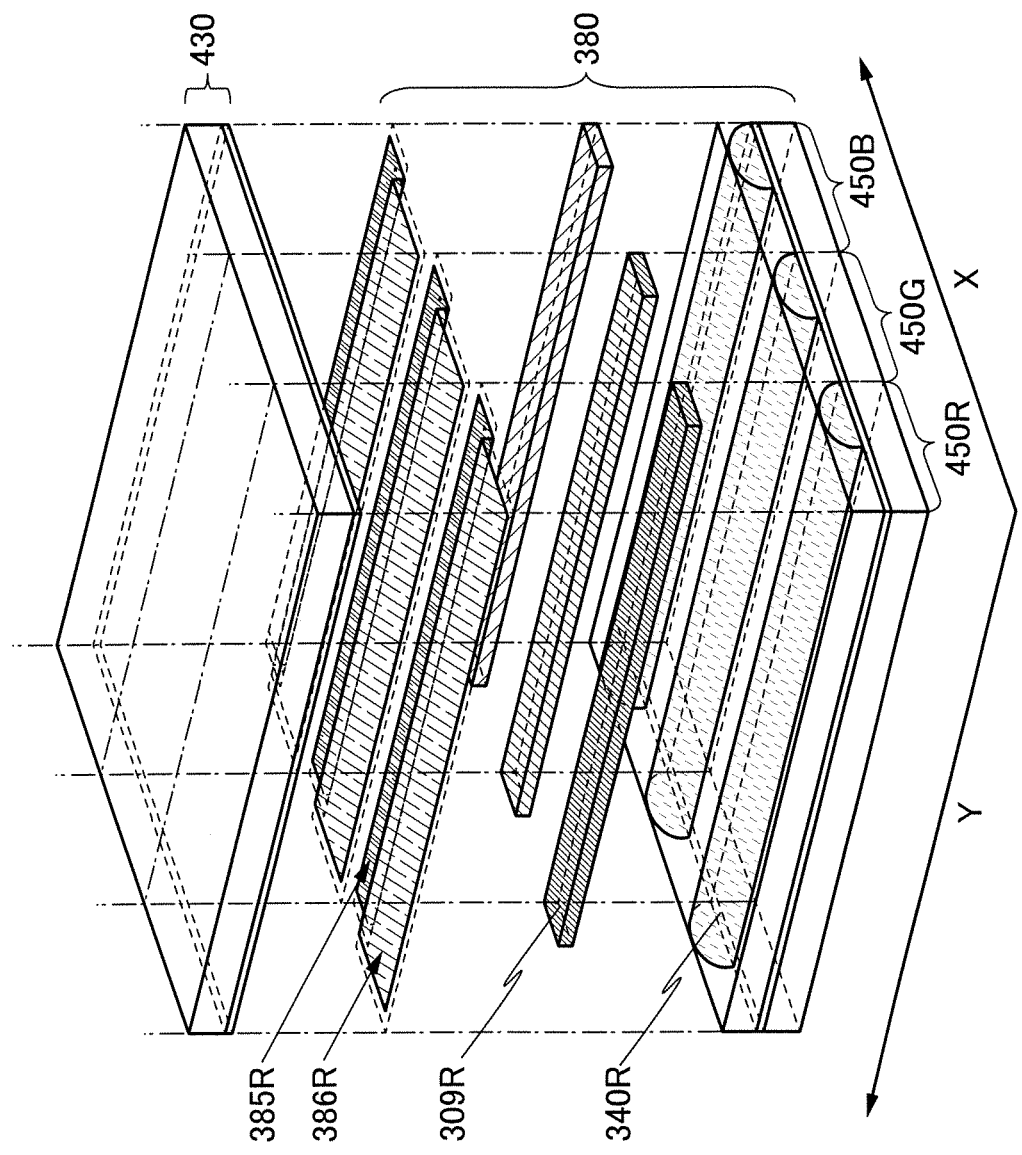
FIG. 5 illustrates an example of a pixel structure of a liquid crystal display device according to an embodiment.

An outline of the liquid crystal display device in this embodiment is described with reference to a perspective view in FIG. 5. The active matrix substrate 380 and the counter substrate 430 overlap with each other. The active matrix substrate 380 is provided with the sub-pixel 450R, the sub-pixel 450G, and the sub-pixel 450B.

The sub-pixel 450R is provided at a position where the anisotropic light-condensing means 340R, the coloring layer 309R, and the region 385R transmitting visible light in the pixel electrode overlap with each other. The region 386R reflecting visible light in the pixel electrode is also provided.

With the above structure, light which enters the anisotropic light-condensing means from the light receiving region on the substrate side is condensed to the region transmitting visible light in the pixel electrode. As a result, intensity of transmitted light can be increased without drastically reducing the area of the region reflecting visible light in the pixel electrode, so that images displayed by liquid crystal display in a transmissive mode become bright and contrast and image quality can be improved. In addition, power consumption can be reduced.

Furthermore, the area of the region reflecting visible light in the pixel electrode can be increased, so that images displayed by liquid crystal display in a reflective mode become bright and contrast and image quality is improved.

This embodiment can be combined with any of the other embodiments in this specification as appropriate.

Embodiment 2

In this embodiment, a method for manufacturing the liquid crystal display device described in Embodiment 1 in which an anisotropic light-condensing means having a condensing direction X and a non-condensing direction Y is provided to overlap with a region transmitting visible light in a pixel electrode which includes the region transmitting visible light and a region reflecting visible light will be described with reference to FIGS. 6A to 6C and FIGS. 7A and 7B.

Figure 6A:
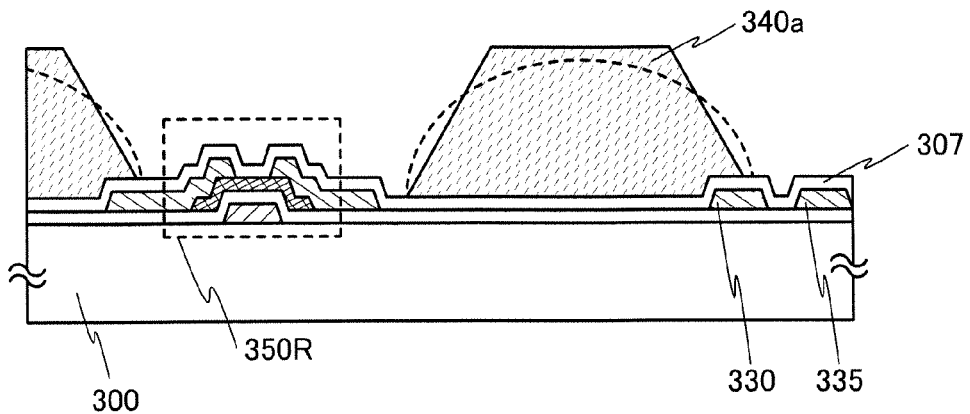
FIGS. 6A to 6C illustrate manufacturing steps of a liquid crystal display device according to an embodiment.
Figure 6B:
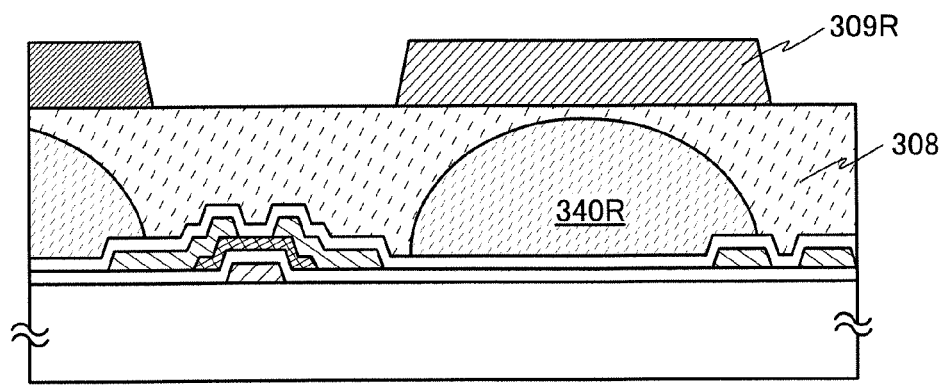
Figure 6C:
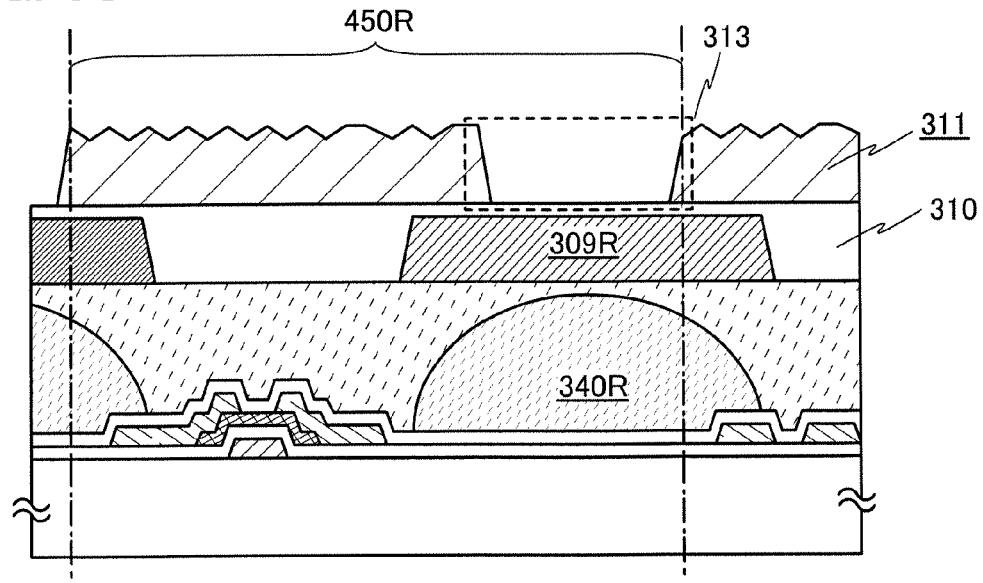

There is no particular limitation on the switching element formed over the substrate 300. As the switching element, a top gate transistor or a bottom gate transistor can be employed, for example. Further, the transistor may have a single gate structure including one channel formation region, a double gate structure including two channel formation regions, or a triple gate structure including three channel formation regions. Alternatively, the transistor may have a dual gate structure including two gate electrode layers positioned over and below a channel region with a gate insulating layer provided therebetween. As an example, FIGS. 6A to 6C illustrate the case where the transistor 350R with a bottom gate structure is employed.

Note that a transistor including an oxide semiconductor layer in which off state current is reduced is especially suitable as the switching element. When the transistor including an oxide semiconductor layer in which off-state current is reduced is used as a pixel transistor, for example, frequency of rewrites of display elements is reduced in a period during which a still image is displayed; thus, a display device with less power consumption can be provided.

The insulating layer 307 is formed over the transistor 350R. As the insulating layer 307, typically, an inorganic insulating film such as a silicon oxide film, a silicon oxynitride film, an aluminum oxide film, and an aluminum oxynitride film can be used. Alternatively, the insulating layer 307 may be formed by stacking a plurality of insulating films. For example, an inorganic insulating film such as a silicon nitride film, an aluminum nitride film, a silicon nitride oxide film, or an aluminum nitride oxide film can be stacked over the above-mentioned inorganic insulating film. Note that the inorganic insulating film can be formed by a sputtering method or the like.

Next, a resin layer 340a is provided over the insulating layer 307 so as to overlap with the region transmitting visible light in the substrate 300. In FIG. 6A, the resin layer 340a is provided in a region transmitting visible light between the source electrode or the drain electrode of the transistor 350R and the data signal line 330 of an adjacent pixel. A thermoplastic material is used, for example, for the resin layer 340a. An organic resin layer having thermoplasticity and a resist mask over the organic resin layer are formed, and the resist mask is used to remove an unnecessary portion by etching so that the organic resin layer can be formed in an island shape or a linear shape. FIG. 6A is a cross-sectional view at this stage. Note that, although not illustrated, the resin layer 340a extends in a depth direction of the drawing, maintaining the same cross-sectional shape. As the organic resin, a material whose refractive index is 1.7 or larger is preferably used.

Then, heat treatment is performed on the substrate 300 so that the resin layer 340a having thermoplasticity is transformed into the anisotropic light-condensing means 340R. A method for forming the anisotropic light-condensing means 340R is not limited to this method. For example, a minute mold formed by an electro-forming method or the like may be pressed against the resin layer 340a having thermoplasticity while being heated, so that the resin layer 340a is transformed into the anisotropic light-condensing means 340R.

Next, the insulating layer 308 covering the anisotropic light-condensing means 340R is formed using a spin coating method or the like. The insulating layer 308 has a function of planarizing unevenness caused by the structures provided over the substrate 300. A material is selected for the insulating layer 308, such that the difference between the refractive index of the material and that of the anisotropic light-condensing means 340R is 0.1 or more. As the difference between the refractive indices thereof increases, the anisotropic light-condensing means 340R can condense light at a steeper angle.

Then, the coloring layer 309R functioning as a color filter is formed over the insulating layer 308. The coloring layer 309R is formed using a photosensitive material so as to cover the anisotropic light-condensing means 340R using a photomask. In the case of providing coloring layers with a plurality of colors, for example, coloring layers exhibiting red (R), green (G), and blue (B), a step of forming the coloring layer may be repeated a number of times equal to the number of the colors. FIG. 6B is a cross-sectional view at this stage.

Next, the overcoat layer 310 is formed over the coloring layer using a spin coating method or the like. The overcoat layer 310 covers and planarizes unevenness caused by the coloring layer.

Then, the insulating layer 311 is provided over the overcoat layer 310. For the insulating layer 311, a photosensitive organic resin can be used, for example. A photosensitive organic resin layer is formed using a spin coating method or the like, and light exposure for providing an opening 313 over the anisotropic light-condensing means 340R is performed first, using a photo mask. Then, light exposure for forming an uneven structure on a surface of the insulating layer 311 is performed using another photomask. After that, the photosensitive organic resin layer is developed so that the insulating layer 311 is formed. FIG. 6C illustrates a cross-sectional view at this stage. Note that, although not illustrated, the opening 313 in the insulating layer 311 overlaps with the anisotropic light-condensing means 340R and extends in a depth direction of the drawing, maintaining substantially the same cross-sectional shape.

Next, an opening 312 is formed in the insulating layer 307, the insulating layer 308, the overcoat layer 310, and the insulating layer 311 so as to reach the source electrode or the drain electrode of the transistor 350R.

Then, a conductive film transmitting visible light is formed over the insulating layer 311, the overcoat layer 310, and the opening 312. The conductive film is connected to the source electrode or the drain electrode of the transistor 350R through the opening 312. Next, an unnecessary portion is removed using a resist mask to form the first pixel electrode 315R. A part of the first pixel electrode 315R constitutes the region 385R transmitting visible light in the pixel electrode.

Further, a conductive film reflecting visible light is formed and an unnecessary portion is removed using a resist mask to form the second pixel electrode 316R. The second pixel electrode 316R is electrically connected to the source electrode or the drain electrode of the transistor 350R through the first pixel electrode 315R, and constitutes the region 386R reflecting visible light in the pixel electrode.

Then, the alignment film 319 is formed to cover the first pixel electrode 315R and the second pixel electrode 316R, and subjected to rubbing treatment. Since rubbing treatment is performed by physical contact, when the rubbing treatment is performed on a surface having a recessed region, unevenness is likely to be caused in the treatment. Specifically, as compared with the region 386R reflecting visible light in the pixel electrode positioned above the insulating layer 311, it is more difficult to perform rubbing treatment on the region 385R transmitting visible light in the pixel electrode positioned at the opening 313 in the insulating layer 311 because the region is recessed.

Figure 7A:
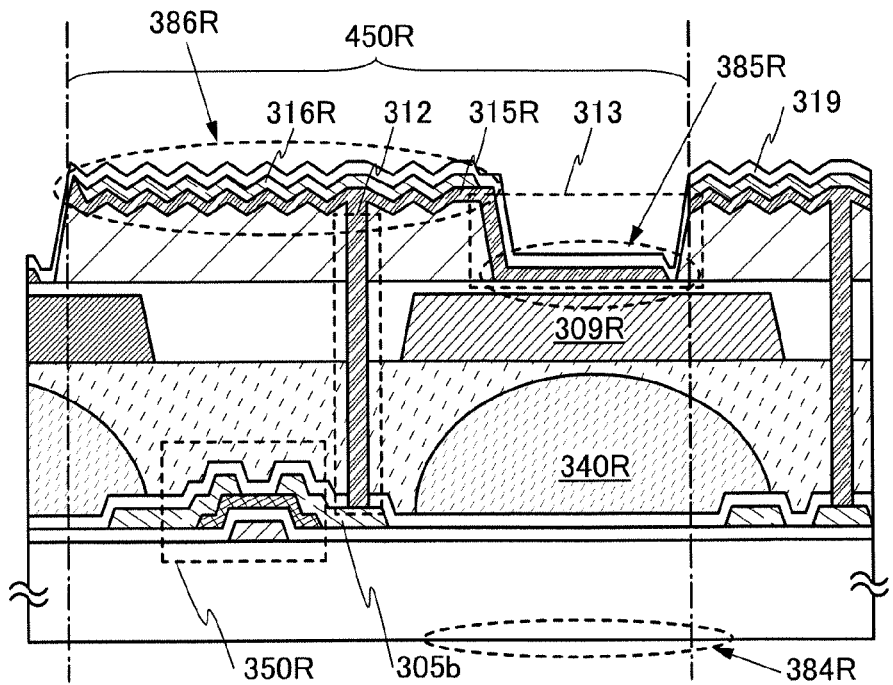
FIGS. 7A and 7B illustrate manufacturing steps of a liquid crystal display device according to an embodiment.

However, the opening 313 in the insulating layer 311 described in this embodiment successively extends along the anisotropic light-condensing means, in a depth direction of the drawing. Therefore, unevenness can be prevented from being caused by performing the rubbing treatment in the depth direction. FIG. 7A is a cross-sectional view at this stage.

Figure 7B:
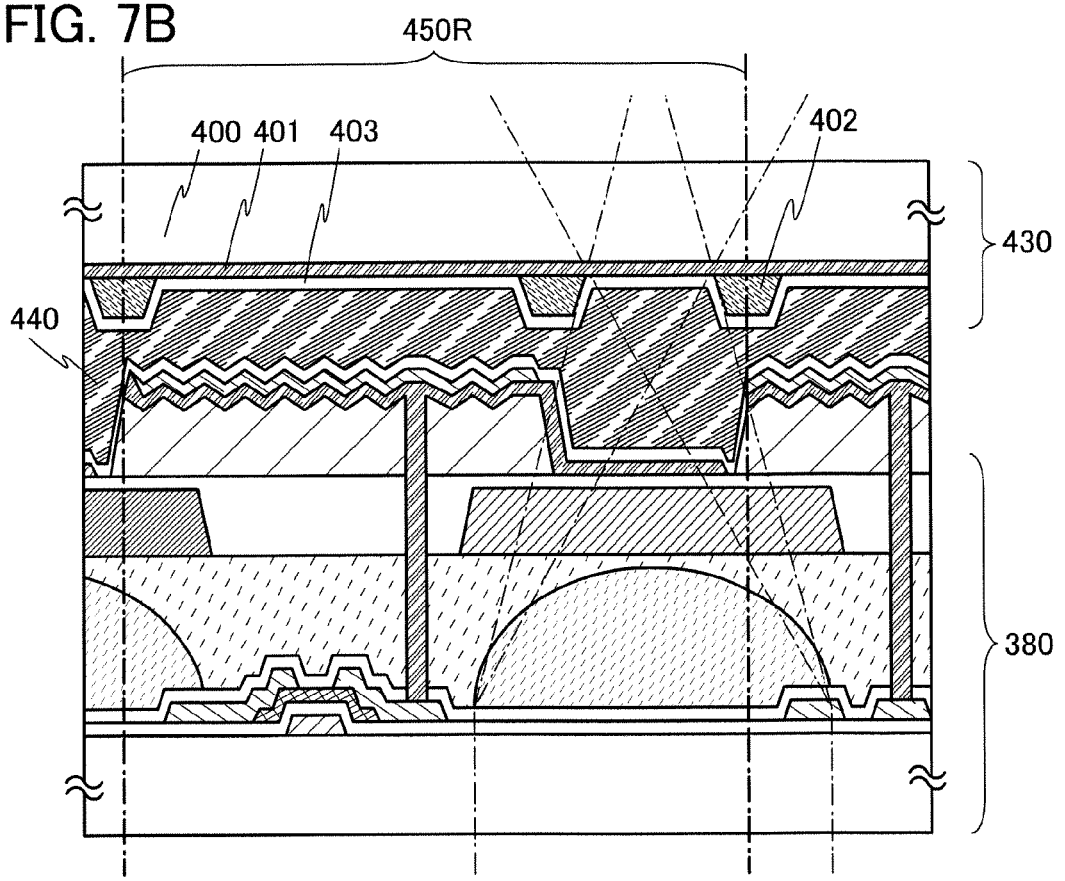

In the counter substrate 430, the counter electrode 401, the black matrix 402 over the counter electrode 401, and the alignment film 403 covering the counter electrode 401 and the black matrix 402 can be formed over the substrate 400 using a known method. The black matrix 402 is positioned so as to overlap with the boundary between the region reflecting visible light in the pixel electrode and the region transmitting visible light in the pixel electrode and the boundaries between adjacent pixels or sub-pixels. The counter substrate 430 and the active matrix substrate 380 are bonded to each other and the liquid crystal layer 440 is formed by injecting liquid crystal, so that the liquid crystal display device is manufactured. FIG. 7B illustrates a cross-sectional view at this stage.

Since the anisotropic light-condensing means, the color filter, and the region transmitting visible light in the pixel electrode are formed over the same substrate, they can easily be positioned on an optical axis of the light-condensing means, whereby yield can be improved.

This embodiment can be combined with any of the other embodiments in this specification as appropriate.

Embodiment 3

In this embodiment, a structure of a semi-transmissive liquid crystal display module will be described. The semi-transmissive liquid crystal display module described in this embodiment displays images in mono-color display when used in a reflective mode, and displays images in full-color display when used in a transmissive mode.

Figure 8:
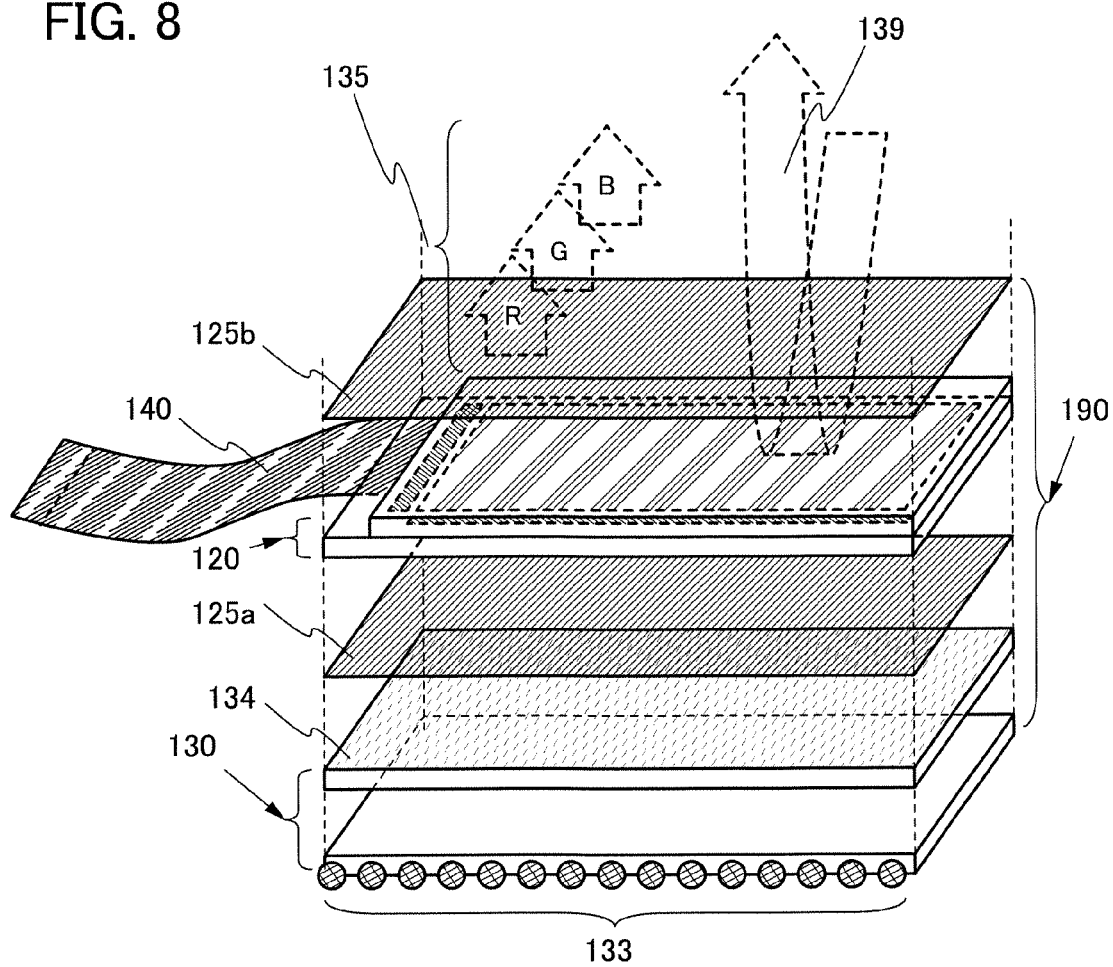
FIG. 8 illustrates a liquid crystal display module according to an embodiment.

FIG. 8 illustrates a structure of a liquid crystal display module 190. The liquid crystal display module 190 includes a backlight portion 130, a display panel 120 in which liquid crystal elements are arranged in matrix, and a polarizing plate 125a and a polarizing plate 125b with the display panel 120 provided therebetween. The backlight portion 130 is a surface-emitting backlight portion which emits uniform white light. For example, the backlight portion 130 may be a backlight portion including a white LED 133 placed in an edge portion of a light guide plate and a diffusing plate 134 provided between the light guide plate and the display panel 120. In addition, a flexible printed circuit (FPC) 140 serving as an external input terminal is electrically connected to a terminal portion provided in the display panel 120.

Note that each of the liquid crystal elements provided in the display panel 120 has a structure similar to that of the pixel 450 described in Embodiment 1.

First, a method for displaying images in a reflective mode is described. In FIG. 8, an arrow is used to schematically illustrate how external light 139 is transmitted through a liquid crystal layer of the liquid crystal element provided in the display panel 120 and reflected by a reflective electrode to the viewer side. The external light 139 is transmitted through a liquid crystal layer, reflected by the reflective electrode, and transmitted through the liquid crystal layer again to be extracted. The intensity of the light which is transmitted through the liquid crystal elements is modulated by an image signal. Therefore, a viewer can perceive an image by reflected light of the external light 139.

Next, a method for displaying images in a transmissive mode is described. In FIG. 8, arrows indicating light 135 of three colors (R, G, and B) are used to schematically illustrate how light from the backlight portion 130 enters a back surface of the display panel 120 and is transmitted to the viewer side through an anisotropic light-condensing means, a coloring layer, a transmissive electrode, and the liquid crystal layer which are provided in the display panel. For example, in a part of the pixel overlapping with a red coloring layer functioning as a color filter, light from the backlight is condensed to the red coloring layer by the anisotropic light-condensing means provided in the display panel, and transmitted through the coloring layer, the transmissive electrode, and the liquid crystal layer to be extracted as red light. The intensity of the light transmitted through the liquid crystal elements is modulated by an image signal. Therefore, a viewer can perceive an image by the light 135 of three colors. Note that since full-color display is employed, a circuit configuration is employed in which three display elements of a red display element, a green display element, and a blue display element are supplied with respective video signals different from each other.

This embodiment can be combined with any of the other embodiments in this specification as appropriate.

Embodiment 4

In this embodiment, one mode of a liquid crystal display device of the present invention and a driving method thereof in which low power consumption can be achieved will be described with reference to FIG. 9, FIG. 10, FIG. 11, FIG. 12, FIGS. 13A and 1313, and FIG. 14.

Figure 9:
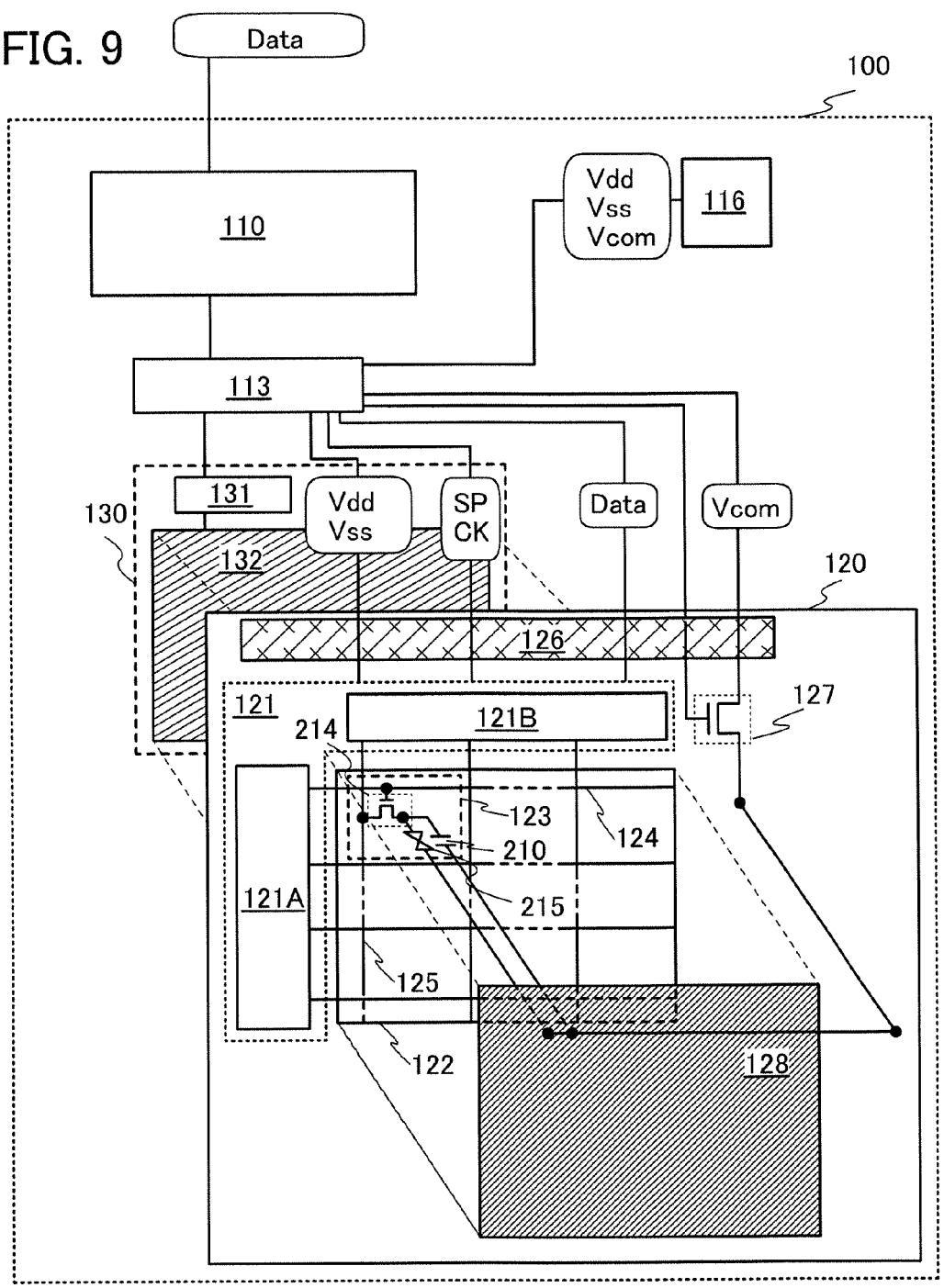
FIG. 9 is a block diagram illustrating a structure of a liquid crystal display device according to an embodiment.

Components of a liquid crystal display device 100 described in this embodiment are illustrated in a block diagram of FIG. 9. The liquid crystal display device 100 includes an image processing circuit 110, a power supply 116, a display control circuit 113, and the display panel 120. In the case of a transmissive liquid crystal display device or a semi-transmissive liquid crystal display device, the backlight portion 130 is further provided as a light source.

To the liquid crystal display device 100, an image signal (an image signal Data) is supplied from an external device connected to the liquid crystal display device. Note that power supply potential (high power supply potential $V_{dd}$, low power supply potential $V_{ss}$, and common potential $V_{com}$) is supplied by turning on the power supply 116 of the liquid crystal display device and starting supplying power, and a control signal (a start pulse SP and a clock signal CK) is supplied by the display control circuit 113.

Note that the high power supply potential $V_{dd}$ is a potential higher than a reference potential, and the low power supply potential $V_{ss}$ is a potential lower than or equal to the reference potential. Note that it is desirable that each of the high power supply potential $V_{dd}$ and the low power supply potential $V_{ss}$ be a potential such that a transistor can operate. The high power supply potential $V_{dd}$ and the low power supply potential $V_{ss}$ are collectively referred to as a power supply voltage in some cases.

The common potential $V_{com}$ may be any potential as long as it serves as reference with respect to the potential of an image signal supplied to a pixel electrode. For example, the common potential $V_{com}$ may be a ground potential.

Note that the image signal Data may be appropriately inverted in accordance with dot inversion driving, source line inversion driving, gate line inversion driving, frame inversion driving, or the like to be input to the liquid crystal display device 100. In the case where the image signal is an analog signal, it may be converted to a digital signal through an A/D converter or the like to be supplied to the liquid crystal display device 100.

In this embodiment, the common potential $V_{com}$ that is a fixed potential is supplied from the power supply 116 to a common electrode 128 and one electrode of a capacitor 210 through the display control circuit 113.

The display control circuit 113 is a circuit which supplies a display panel image signal (Data), a control signal (specifically, a signal for controlling switching between supply and stop of the control signal such as the start pulse SP and the clock signal CK), and the power supply potential (the high power supply potential $V_{dd}$, the low power supply potential $V_{ss}$, and the common potential $V_{com}$) to the display panel 120.

The image processing circuit 110 analyzes, calculates, and processes an input image signal (image signal Data), and then outputs the processed image signal together with a control signal to the display control circuit 113.

Specifically, the image processing circuit 110 analyzes the input image signal Data, determines whether the input image signal Data is for a moving image or a still image, and outputs a control signal including the determination result to the display control circuit 113. Further, the image processing circuit 110 captures a still image of one frame from the image signal Data including a moving image or a still image and outputs the captured image together with a control signal which indicates that the captured image is a still image to the display control circuit 113. The image processing circuit 110 outputs the input image signal Data together with the above control signal to the display control circuit 113. Note that the above-described function is an example of functions which the image processing circuit 110 has, and a variety of image processing functions may be selected and applied in accordance with applications of the display device.

Note that since an image signal which is converted to a digital signal is easily calculated (e.g., detection of a difference between image signals), in the case where an input image signal (image signal Data) is an analog signal, an A/D converter or the like is provided in the image processing circuit 110.

The display panel 120 has a structure in which a liquid crystal element 215 is provided between a pair of substrates (a first substrate and a second substrate). Specifically, the pixel electrode including a region transmitting visible light and a region reflecting visible light and the anisotropic light-condensing means having a condensing direction X and a non-condensing direction Y overlapping with the region transmitting visible light in the pixel electrode which are described in Embodiment 1 are provided on the same surface side of the first substrate. The first substrate includes a driver circuit portion 121 and a pixel portion 122. The second substrate includes a common connection portion (also referred to as a common contact) and the common electrode 128 (also referred to as a counter electrode). The common connection portion electrically connects the first substrate and the second substrate. The common connection portion may be provided over the first substrate.

In the pixel portion 122, a plurality of gate lines (scan lines) 124 and a plurality of source lines (signal lines) 125 are provided. A plurality of pixels 123 is provided in matrix so as to be surrounded by the gate lines 124 and the source lines 125. In the display panel described in this embodiment, the gate line 124 and the source line 125 are extended from a gate line side driver circuit 121A and a source line side driver circuit 121B, respectively.

In addition, the pixel 123 includes a transistor 214 as a switching element, and the capacitor 210 and the liquid crystal element 215 which are connected to the transistor 214.

The liquid crystal element 215 is an element that controls transmission and non-transmission of light by an optical modulation action of liquid crystal. The optical modulation action of liquid crystal is controlled by an electric field applied to the liquid crystal. The direction of the electric field applied to the liquid crystal varies according to a liquid crystal material, a driving method, and an electrode structure and can be selected as appropriate. For example, in the case where a driving method in which an electric field is applied in a thickness direction (a so-called vertical direction) of liquid crystal is used, the pixel electrode and the common electrode may be provided in the first substrate and the second substrate, respectively, so as to sandwich the liquid crystal. In the case where a driving method in which an electric field is applied in an in-plane direction of a substrate (a so-called horizontal direction) to liquid crystal is used, the pixel electrode and the common electrode may be provided over the same substrate with respect to the liquid crystal. The pixel electrode and the common electrode may have a variety of opening patterns. In this embodiment, there is no particular limitation on a liquid crystal material, a driving method, and an electrode structure as long as an element controls transmission and non-transmission of light by the optical modulation action.

In the transistor 214, one of the plurality of gate lines 124 provided in the pixel portion 122 is connected to the gate electrode, one of a source electrode and a drain electrode is connected to one of the plurality of source lines 125, and the other of the source electrode and the drain electrode is connected to one of the electrodes of the capacitor 210 and one of the electrodes of the liquid crystal element 215 (pixel electrode).

With such a structure, the capacitor 210 can hold voltage applied to the liquid crystal element 215. The electrode of the capacitor 210 may be connected to a capacitor line additionally provided.

As the transistor 214, a transistor whose off-state current is reduced is preferably used. When the off-state current is reduced, the transistor 214 in an off-state can stably hold charge in the liquid crystal element 215 and the capacitor 210. Further, when the transistor 214 whose off-state current is sufficiently reduced is used, the pixel 123 can be formed without providing the capacitor 210.

The driver circuit portion 121 includes the gate line side driver circuit 121A and the source line side driver circuit 121B. The gate line side driver circuit 121A and the source line side driver circuit 121B are driver circuits for driving the pixel portion 122 that includes a plurality of pixels and each include a shift register circuit (also referred to as a shift register).

Note that the gate line side driver circuit 121A and the source line side driver circuit 121B may be formed over the same substrate as the pixel portion 122 or over another substrate.

Note that the high power supply potential $V_{dd}$, the low power supply potential $V_{ss}$, the start pulse SP, the clock signal CK, and the image signal Data which are controlled by the display control circuit 113 are supplied to the driver circuit portion 121.

A terminal portion 126 is an input terminal which supplies a predetermined signal output from the display control circuit 113 (such as the high power supply potential $V_{dd}$, the low power supply potential $V_{ss}$, the start pulse SP, the clock signal CK, the image signal Data, and the common potential $V_{com}$) and the like, to the driver circuit portion 121.

The common electrode 128 is electrically connected to a common potential line for supplying the common potential $V_{com}$, which is controlled by the display control circuit 113, in the common connection portion.

As a specific example of the common connection portion, the common electrode 128 and the common potential line can be electrically connected with a conductive particle in which an insulating sphere is covered with a thin metal film provided therebetween. Note that two or more common connection portions may be provided in the display panel 120.

The liquid crystal display device may include a photometric circuit. The liquid crystal display device provided with the photometric circuit can detect the brightness of the environment where the liquid crystal display device is put. Thus, the display control circuit 113 connected to the photometric circuit can control a driving method of a light source such as a backlight and a sidelight in accordance with a signal input from the photometric circuit.

The backlight portion 130 includes a backlight control circuit 131 and a backlight 132. The backlight 132 may be selected and combined in accordance with applications of the liquid crystal display device 100, and a cold cathode fluorescent lamp, a light-emitting diode (LED), or the like can be used. For example, a white light-emitting element (e.g., LED) can be provided in the backlight 132. A backlight signal for controlling the backlight and the power supply potential are supplied from the display control circuit 113 to the backlight control circuit 131.

Note that an optical film (such as a polarizing film, a retardation film, or an anti-reflection film) can also be used in combination. For a light source of the backlight 132, a surface light source formed using a plurality of LED light sources, a plurality of electroluminescent (EL) light sources, or the like may be used. As the surface light source, three or more kinds of LEDs may be used and an LED emitting white light may be used. Note that the color filter is not always provided in the case where light-emitting diodes of RGB or the like are arranged in a backlight and a successive additive color mixing method (a field sequential method) in which color display is performed by time division is employed.

Next, a driving method of the liquid crystal display device illustrated in FIG. 9 will be described with reference to FIG. 10, FIG. 11, FIG. 12, FIGS. 13A and 13B, and FIG. 14. The driving method of the liquid crystal display device described in this embodiment is a display method in which the frequency of rewriting in the display panel varies in accordance with properties of an image to be displayed. Specifically, in the case where image signals in successive frames are different from each other (i.e., a moving image is displayed), a display mode in which an image signal is written to every frame is employed. On the other hand, in the case where image signals in successive frames are the same (i.e., a still image is displayed), the following display mode is employed: image signals are prevented from being written or the writing frequency is extremely reduced in a period during which the same image is being displayed; the voltage applied to the liquid crystal element is held by setting potentials of the pixel electrode and the common electrode for applying a voltage to the display element in a floating state; and accordingly a still image is displayed without an additional supply of potential.

The liquid crystal display device displays a moving image and a still image in combination on its screen. By switching of a plurality of different images which is time-divided into a plurality of frames at high speed, the images are recognized as a moving image by human eyes. Specifically, by switching of images at least 60 times (60 frames) per second, the images are recognized as a moving image with less flicker by human eyes. In contrast, unlike a moving image and a partial moving image, a still image is an image which does not change in successive frame periods, for example, in an n-th frame and an (n+1)th frame, even when a plurality of images which are time-divided into a plurality of frame periods are switched at high speed.

The liquid crystal display device according to the present invention can be operated in different display modes, a moving-image display mode and a still-image display mode, in the case of displaying a moving image and displaying a still image, respectively. In this specification, an image displayed in the case of displaying a still image is also referred to as a still image.

Next, components of the liquid crystal display device 100 of this embodiment are described with reference to a block diagram of FIG. 10. The liquid crystal display device 100 is an example of a semi-transmissive liquid crystal display device in which a liquid crystal layer is combined with polarizing plates to control a polarization state of light in a pixel so that display is performed, and includes the image processing circuit 110, the power supply 116, the display panel 120, and the backlight portion 130.

To the liquid crystal display device 100, an image signal (an image signal Data) is supplied from an external device connected to the liquid crystal display device. Note that power supply potential (high power supply potential $V_{dd}$, low power supply potential $V_{ss}$, and common potential $V_{com}$) is supplied by turning on the power supply 116 of the liquid crystal display device and starting supplying power, and a control signal (a start pulse SP and a clock signal CK) is supplied by the display control circuit 113.

Next, a structure of the image processing circuit 110 and a procedure in which the image processing circuit 110 processes signals are described with reference to FIG. 10 as an example. Note that the image processing circuit 110 illustrated in FIG. 10 is just one mode of this embodiment and this embodiment is not limited to this structure.

Figure 10:
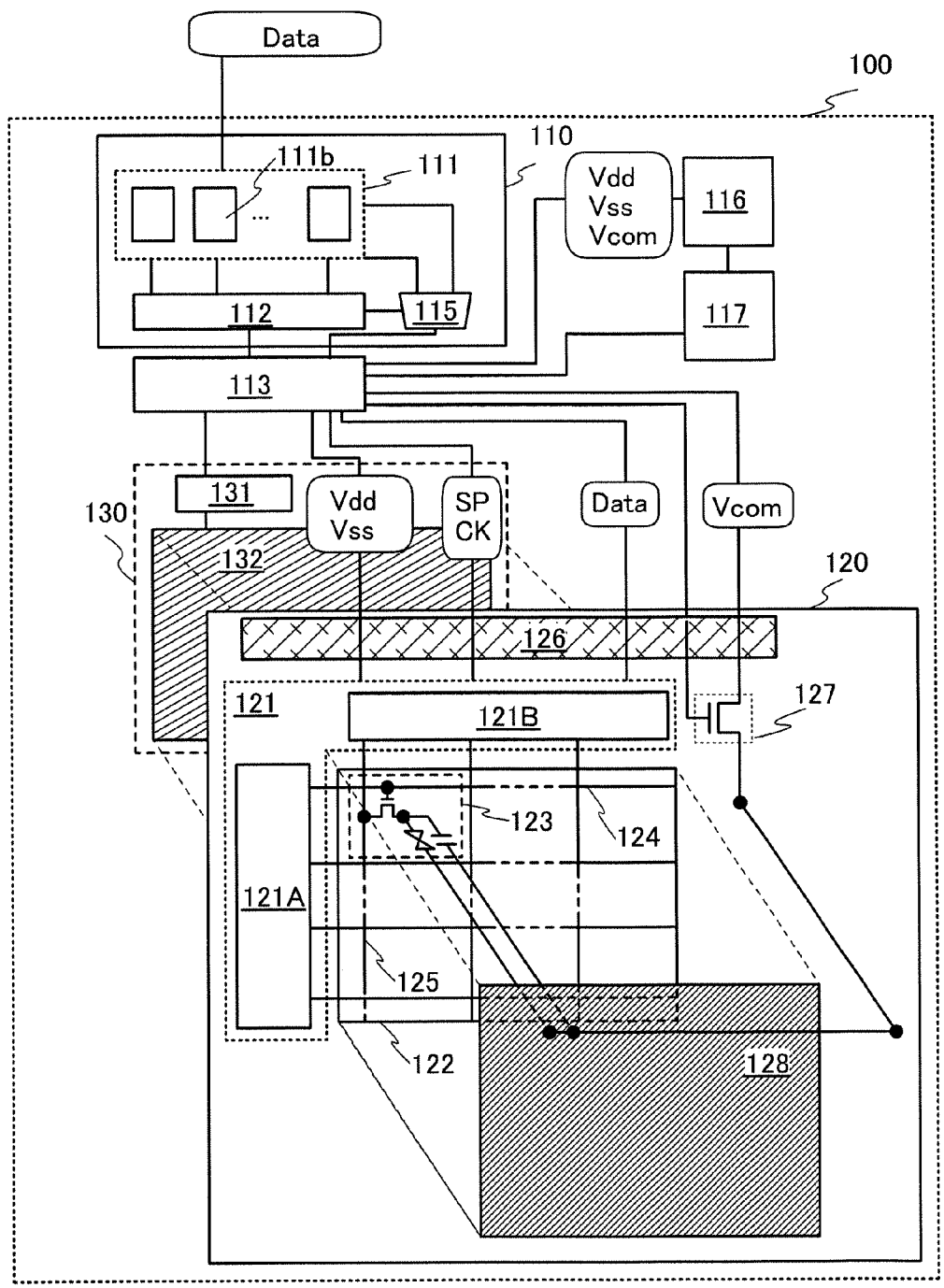
FIG. 10 is a block diagram illustrating a structure of a liquid crystal display device according to an embodiment.

The image processing circuit 110 illustrated in FIG. 10 analyzes image signals which are successively input and determines whether the input image signal is for a moving image or a still image. When the input of image signals (image signal Data) is switched from an input of a moving image signal to an input of a still image signal, the image processing circuit 110 captures a still image and outputs the captured image together with a control signal which indicates that the captured image is a still image to the display control circuit 113. When the input of image signals (image signal Data) is switched from an input of a still image signal to an input of a moving image signal, the image processing circuit 110 outputs an image signal including a moving image together with a control signal which indicates that the image signal is a moving image to the display control circuit 113.

The image processing circuit 110 includes a memory circuit 111, a comparison circuit 112, and a selection circuit 115. The image processing circuit 110 generates a display panel image signal and a backlight signal from the digital image signal Data that is input. The display panel image signal is an image signal that controls the display panel 120. The backlight signal is a signal that controls the backlight portion 130. The image processing circuit 110 outputs a signal that controls the common electrode 128 to a switching element 127.

The memory circuit 111 includes a plurality of frame memories for storing image signals for a plurality of frames.

The number of frame memories included in the memory circuit 111 is not particularly limited as long as the image signals for a plurality of frames can be stored. Note that the frame memory may be formed using a memory element such as dynamic random access memory (DRAM) or static random access memory (SRAM).

Note that the number of frame memories is not particularly limited as long as an image signal can be stored for each frame period. In addition, the image signals stored in the frame memories are selectively read out by the comparison circuit 112 and the display control circuit 113. A frame memory 111b in the diagram illustrates a memory region for one frame conceptually.

The comparison circuit 112 is a circuit which selectively reads out image signals in successive frame periods stored in the memory circuit 111, compares the image signals in the successive frame periods in each pixel, and detects a difference thereof.

In this embodiment, depending on whether a difference of image signals between frames is detected or not, operations in the display control circuit 113 and the selection circuit 115 are determined. When a difference is detected in any of the pixels between frames by the comparison circuit 112 (when there is a difference), the comparison circuit 112 determines that the image signal is not a signal for displaying a still image and that the successive frame periods during which a difference is detected is a period during which a moving image is to be displayed.

On the other hand, when a difference is not detected in any of the pixels by the comparison between image signals in the comparison circuit 112 (when there is no difference), the successive frame periods during which the difference is not detected is determined as a period during which a still image is to be displayed. In other words, by detection of the differences in the comparison circuit 112, it is determined whether the image signals in successive frame periods are image signals for displaying moving images or image signals for displaying still images.

Note that the criterion of determining that there is a difference by the comparison may be set such that the difference is recognized when the difference exceeds a certain value. The comparison circuit 112 may be set to determine detection of a difference by the absolute value of the difference.

Although, in this embodiment, the structure in which whether an image is a moving image or a still image is determined by detection of the difference between the image signals in successive frame periods by the comparison circuit 112 provided inside the liquid crystal display device 100 is described, a structure in which a signal indicating whether the image is a still image or a moving image is supplied from the outside may be used.

The selection circuit 115 employs a structure in which a plurality of switches formed of transistors are provided, for example. In the case where the comparison circuit 112 detects a difference in successive frame periods, that is, the image is a moving image, the selection circuit 115 selects an image signal of the moving image from the frame memories in the memory circuit 111 and outputs the image signal to the display control circuit 113.

Note that in the case where the comparison circuit 112 does not detect a difference in the successive frame periods, that is, the image is a still image, the selection circuit 115 does not output the image signal to the display control circuit 113 from the frame memories in the memory circuit 111. With the structure in which an image signal is not output to the display control circuit 113 from the frame memory, power consumption of the liquid crystal display device can be reduced.

Note that in the liquid crystal display device of this embodiment, a mode of operation performed when the comparison circuit 112 determines an image as a still image is described as a still-image display mode, and a mode of operation performed when the comparison circuit 112 determines an image as a moving image is described as a moving-image display mode.

The display control circuit 113 is a circuit which supplies an image signal selected by the selection circuit 115, a control signal (specifically, a signal for controlling switching between supply and stop of the control signal such as the start pulse SP and the clock signal CK), and the power supply potential (the high power supply potential $V_{dd}$, the low power supply potential $V_{ss}$, and the common potential $V_{com}$) to the display panel 120 and which supplies a backlight control signal (specifically, a signal for the backlight control circuit 131 to control on and off of the backlight) to the backlight portion 130.

Note that the image processing circuit described in this embodiment as an example may have a display-mode switching function. The display-mode switching function is a function of switching between a moving-image display mode and a still-image display mode in such a manner that a user of the liquid crystal display device selects an operation mode of the liquid crystal display device by hand or using an external connection device.

The selection circuit 115 can output the image signal to the display control circuit 113 in accordance with a signal input from a display-mode switching circuit.

For example, in the case where a mode-switching signal is input to the selection circuit 115 from the display-mode switching circuit while an operation is performed in a still-image display mode, even when the comparison circuit 112 does not detect the difference of the image signals in successive frame periods, the selection circuit 115 can be operated in a mode in which image signals which are input are sequentially output to the display control circuit 113, that is, in a moving-image display mode. In the case where a mode-switching signal is input to the selection circuit 115 from the display-mode switching circuit while an operation is performed in a moving-image display mode, even when the comparison circuit 112 detects the difference of the image signal in successive frame periods, the selection circuit 115 can be operated in a mode in which only an image signal of one selected frame is output, that is, in a still-image display mode. As a result, in the liquid crystal display device of this embodiment, one frame among moving images is displayed as a still image.

Further, in the case where the liquid crystal display device includes a photometric circuit, when the photometric circuit detects brightness and finds that the liquid crystal display device is used in a dim environment, the display control circuit 113 controls light of the backlight 132 to have higher intensity, so that favorable visibility of a display screen is secured. In contrast, when it is found that the liquid crystal display device is used under extremely bright external light (e.g., under direct sunlight outdoors), the display control circuit 113 controls light of the backlight 132 to have lower intensity, so that power consumed by the backlight 132 is reduced.

In this embodiment, the display panel 120 includes the switching element 127 besides the pixel portion 122. In this embodiment, the display panel 120 includes the first substrate and the second substrate. The first substrate includes the driver circuit portion 121, the pixel portion 122, and the switching element 127.

Figure 11:
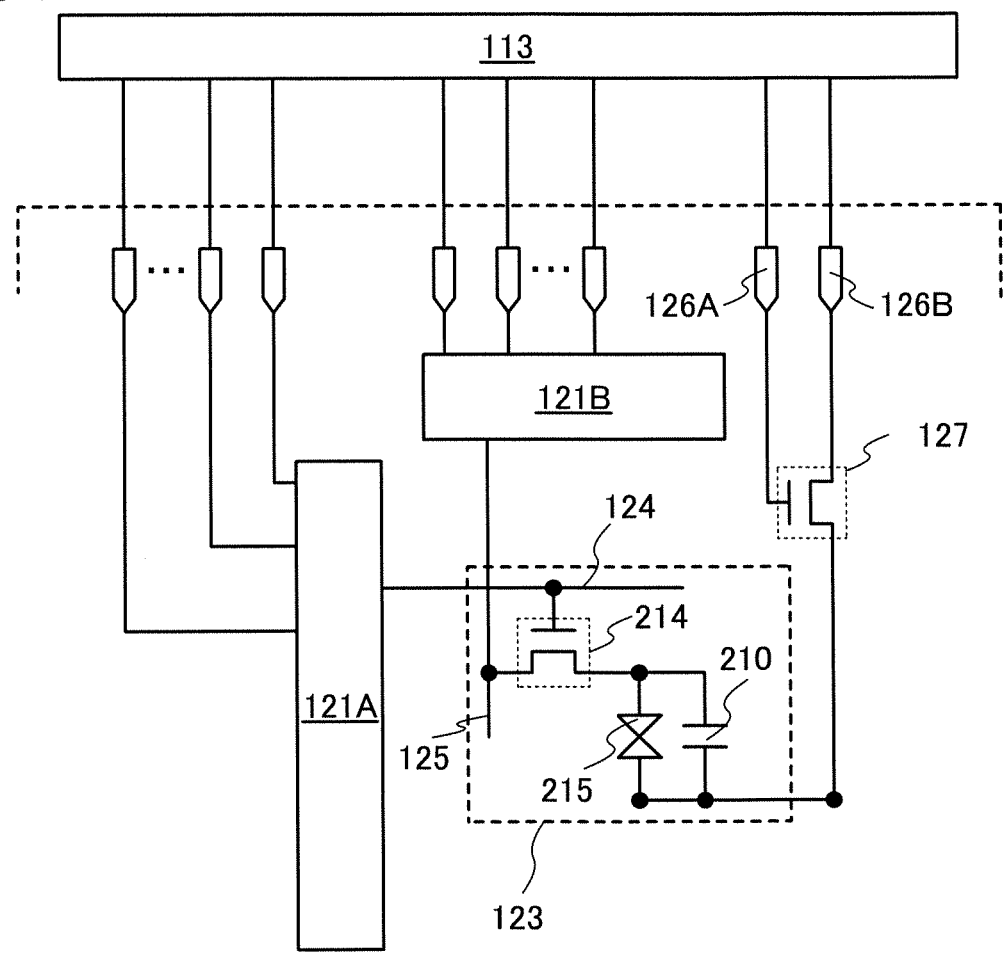
FIG. 11 illustrates a structure of a driver circuit and a pixel of a liquid crystal display device according to an embodiment.

The pixel 123 includes the transistor 214 as a switching element, and the capacitor 210 and the liquid crystal element 215 which are connected to the transistor 214, (see FIG. 11).

A transistor whose off-state current is reduced is preferably used for the transistor 214. When the transistor 214 is off, charges stored in the capacitor 210 and the liquid crystal element 215 which are connected to the transistor 214 whose off-state current is reduced are less likely to leak through the transistor 214, and a state where data is written before the transistor 214 is turned off can be held for a long time.

In this embodiment, liquid crystal is controlled by a vertical electric field that is generated by the pixel electrode provided over the first substrate and the common electrode provided on the second substrate which faces the first substrate.

As an example of liquid crystal applied to a liquid crystal element, the following can be given: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like.

In addition, as a driving method of liquid crystal, the following can be used: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The switching element 127 supplies a common potential $V_{com}$ to the common electrode 128 in accordance with a control signal output from the display control circuit 113. As the switching element 127, a transistor can be used. A gate electrode of the transistor and one of a source electrode and a drain electrode of the transistor may be connected to the display control circuit 113 so that the common potential $V_{com}$ is supplied from the display control circuit 113 to the one of the source electrode and the drain electrode of the transistor through the terminal portion 126. The other of the source electrode and the drain electrode of the transistor may be connected to the common electrode 128. Note that the switching element 127 may be formed over the same substrate as the driver circuit portion 121 or the pixel portion 122. Alternatively, the switching element 127 may be formed over another substrate.

A transistor whose off-state current is reduced is used as the switching element 127, whereby a reduction over time in the voltage applied to both terminals of the liquid crystal element 215 can be suppressed.

One of the source electrode and the drain electrode of the switching element 127 is electrically connected to the common electrode 128 through the common connection portion. Note that the common electrode 128 serves as one electrode of the capacitor 210 and one electrode of the liquid crystal element 215.

The other of the source electrode and the drain electrode of the switching element 127 is connected to a terminal 126B. A gate electrode of the switching element 127 is connected to a terminal 126A.

Next, the state of signals supplied to the pixels will be described with reference to an equivalent circuit diagram of the liquid crystal display device illustrated in FIG. 11 and a timing chart illustrated in FIG. 12.

Figure 12:
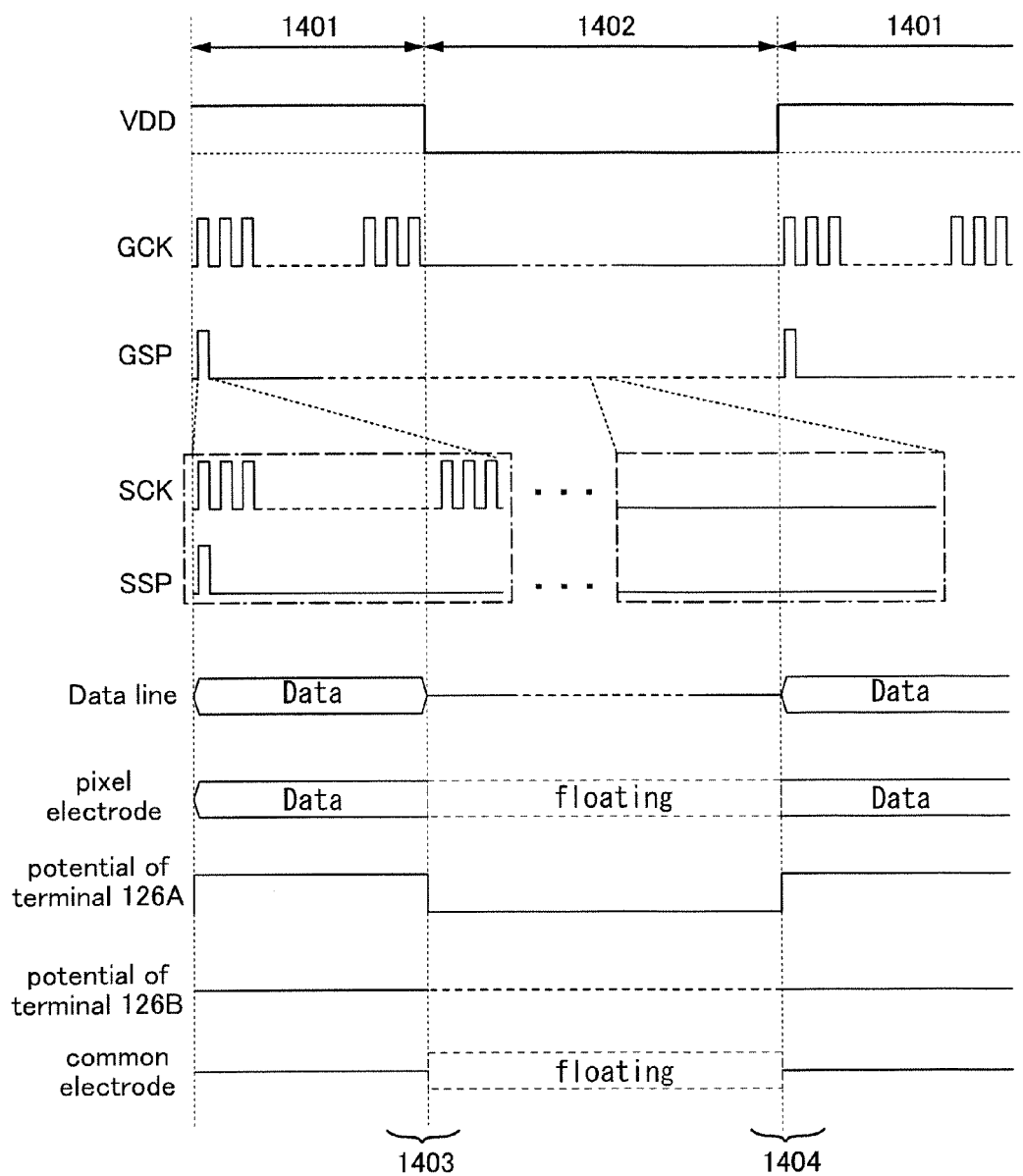
FIG. 12 is a timing chart illustrating operation of a liquid crystal display device according to an embodiment.

In FIG. 12, a clock signal GCK and a start pulse GSP supplied from the display control circuit 113 to the gate line side driver circuit 121A are illustrated. In addition, in FIG. 12, a clock signal SCK and a start pulse SSP which are supplied from the display control circuit 113 to the source line side driver circuit 121B are illustrated. Note that, for the description of the timing at which the clock signal is output, the wavelength of the clock signal is illustrated with a simple rectangular wave in FIG. 12.

In FIG. 12, potential of the source line 125, potential of the pixel electrode, potential of the terminal 126A, potential of the terminal 126B, and potential of the common electrode are illustrated.

In FIG. 12, a period 1401 corresponds to a period during which image signals for displaying a moving image are written. In the period 1401, operation is performed so that the image signals and the common potential are supplied to the pixels in the pixel portion 122 and the common electrode.

A period 1402 corresponds to a period during which a still image is displayed. In the period 1402, the supply of the image signals and the common potential to the pixels in the pixel portion 122 and the common electrode is stopped. Note that in the period 1402 in FIG. 12, each signal is supplied so that the driver circuit portion stops operating; however, it is preferable to write image signals periodically in accordance with the length of the period 1402 and the refresh rate so as to prevent deterioration of a still image.

First, a timing chart in the period 1401 will be described. In the period 1401, a clock signal is supplied all the time as the clock signal GCK, and a pulse in accordance with a vertical synchronizing frequency is supplied as the start pulse GSP. In the period 1401, a clock signal is supplied all the time as the clock signal SCK, and a pulse in accordance with one gate selection period is supplied as the start pulse SSP.

In addition, the image signal Data is supplied to the pixels in each row through the source line 125, and the potential of the source line 125 is supplied to the pixel electrode in accordance with the potential of the gate line 124.

A potential at which the switching element 127 is turned on is supplied from the display control circuit 113 to the terminal 126A of the switching element 127, and the common potential is supplied to the common electrode through the terminal 126B.

On the other hand, the period 1402 is a period during which a still image is displayed. Next, a timing chart of the period 1402 is described. In the period 1402, supplies of the clock signal GCK, the start pulse GSP, the clock signal SCK, and the start pulse SSP are all stopped. Further, in the period 1402, the supply of the image signal Data to the source line 125 is stopped. In the period 1402 where the supply of both the clock signal GCK and the start pulse GSP is being stopped, the transistor 214 is off and the potential of the pixel electrode is in a floating state.

A potential at which the switching element 127 is turned off is supplied from the display control circuit 113 to the terminal 126A of the switching element 127, and the potential of the common electrode is put in a floating state.

In the period 1402, the potentials of both electrodes of the liquid crystal element 215, i.e., the pixel electrode and the common electrode, are put in a floating state; thus, a still image can be displayed without an additional supply of potential.

The supplies of the clock signal and the start pulse to the gate line side driver circuit 121A and the source line side driver circuit 121B are stopped, whereby low power consumption can be achieved.

In particular, a transistor whose off state current is reduced is used for the transistor 214 and the switching element 127, whereby a reduction over time in the voltage applied to both terminals of the liquid crystal element 215 can be suppressed.

Figure 13A:
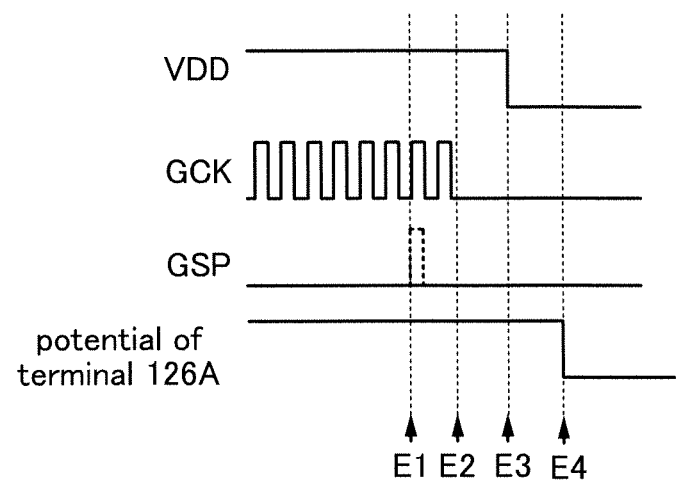
FIGS. 13A and 13B are timing charts illustrating operation of a display control circuit of a liquid crystal display device according to an embodiment.
Figure 13B:
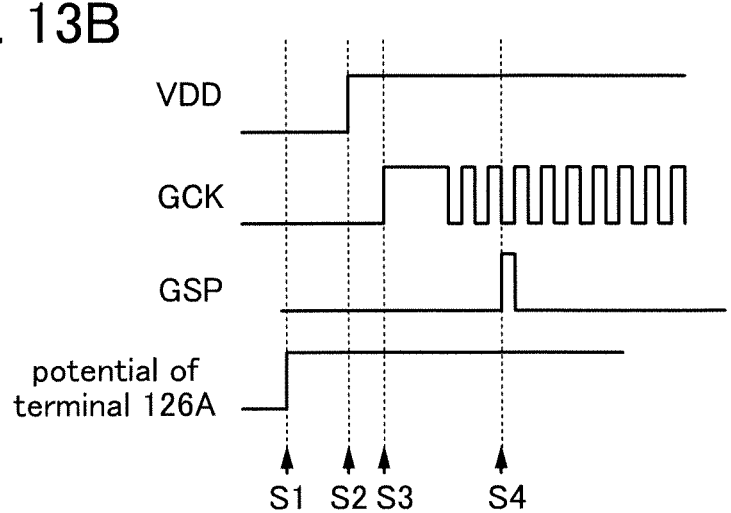

Next, operations of the display control circuit in a period during which a displayed image is switched from a moving image to a still image (a period 1403 in FIG. 12) and in a period during which a displayed image is switched from a still image to a moving image (a period 1404 in FIG. 12) will be described with reference to FIGS. 13A and 13B. FIGS. 13A and 13B illustrate the high power supply potential $V_{dd}$, the clock signal (here, GCK), and the start pulse signal (here, GSP) which are output from the display control circuit, and potential of the terminal 126A.

The operation of the display control circuit in the period 1403 during which a displayed image is switched from a moving image to a still image is illustrated in FIG. 13A. The display control circuit stops the supply of the start pulse GSP (E1 in FIG. 13A, a first step). The supply of the start pulse GSP is stopped and then, the supply of a plurality of clock signals GCK is stopped after pulse output reaches the last stage of the shift register (E2 in FIG. 13A, a second step). Then, the high power supply potential $V_{dd}$ of the power supply voltage is changed to the low power supply potential $V_{ss}$ (E3 in FIG. 13A, a third step). After that, the potential of the terminal 126A is changed to a potential at which the switching element 127 is turned off (E4 in FIG. 13A, a fourth step).

Through the above steps, the supply of signals to the driver circuit portion 121 can be stopped without malfunction of the driver circuit portion 121. The malfunction occurred when a displayed image is switched from a moving image to a still image causes noise, and the noise is held as a still image: therefore, a liquid crystal display device that includes a display control circuit with fewer malfunctions can display a still image with less image deterioration.

Next, an operation of the display control circuit in the period 1404 during which a displayed image is switched from a still image to a moving image will be illustrated in FIG. 13B. The display control circuit changes the potential of the terminal 126A into a potential at which the switching element 127 is turned on (S1 in FIG. 13B, a first step). Then, the power supply voltage is changed from the low power supply potential $V_{ss}$ to the high power supply potential $V_{dd}$ (S2 in FIG. 13B, a second step). After that, high potential is supplied as the clock signal GCK which is a pulsed signal longer than a regular clock signal GCK which is supplied later and then, a plurality of clock signals GCK are supplied (S3 in FIG. 13B, a third step). Next, the start pulse signal GSP is supplied (S4 in FIG. 13B, a fourth step).

Through the above steps, the supply of driving signals to the driver circuit portion 121 can be resumed without causing malfunction of the driver circuit portion 121. Potentials of the wirings are sequentially changed back to those at the time of displaying a moving image, whereby the driver circuit portion can be driven without malfunction.

Figure 14:
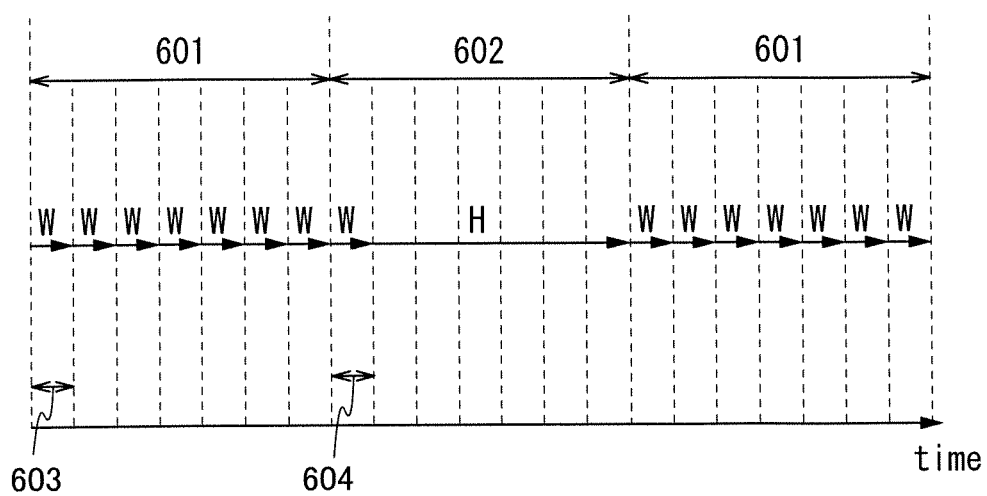
FIG. 14 schematically illustrates the frequency of writing an image signal in frame periods in a period during which a moving image is displayed and a period during which a still image is displayed according to an embodiment.

FIG. 14 schematically illustrates writing frequency of an image signal in frame periods in a period 601 during which a moving image is displayed or in a period 602 during which a still image is displayed. In FIG. 14, W indicates a period in which an image signal is written, and H indicates a period in which the image signal is held. In addition, a period 603 is one frame period in FIG. 14; however, the period 603 may be a different period.

As described above, in the structure of the liquid crystal display device of this embodiment, an image signal of a still image displayed in the period 602 is written in the period 604, and the image signal written in the period 604 is maintained in the other periods of the period 602.

The liquid crystal display device described in this embodiment as an example can decrease writing frequency of an image signal in a period during which a still image is displayed. As a result, power consumption at the time of displaying a still image can be reduced.

In the case where a still image is displayed by rewriting the same image plural times, eye strain may be caused when switching of images is recognized. In the liquid crystal display device of this embodiment, writing frequency of an image signal is reduced, which is effective in reducing eye strain.

Specifically, in the liquid crystal display device of this embodiment, transistors whose off-state currents are reduced are used for pixels and a switching element of the common electrode, whereby a period (time) of holding voltage in a storage capacitor can be longer. As a result, writing frequency of an image signal can be extremely reduced, which is significantly effective in reducing power consumption and eyestrain when a still image is displayed.

This embodiment can be combined with any of the other embodiments in this specification as appropriate.

Embodiment 5

In this embodiment, an example of a transistor including an oxide semiconductor layer, which is used for the liquid crystal display device described in Embodiments 1 and 2, and an example of a manufacturing method of the transistor will be described in detail with reference to FIGS. 15A to 15E. The same portion as or a portion having a function similar to those in the above embodiments can be formed in a manner similar to that described in the above embodiments, and also the steps similar to those in the above embodiments can be performed in a manner similar to that described in the above embodiments, and repetitive description is omitted. In addition, detailed description of the same portions is not repeated.

FIGS. 15A to 15E illustrate an example of a cross-sectional structure of a transistor. A transistor 510 illustrated in FIGS. 15A to 15E is an inverted staggered transistor with a bottom gate structure which is similar to the transistor 350R illustrated in FIG. 2.

Steps of manufacturing the transistor 510 in which an oxide semiconductor is used for a channel formation region over a substrate 505 are described below with reference to FIGS. 15A to 15E.

First, a conductive film is formed over the substrate 505 having an insulating surface, and then a gate electrode layer 511 is formed in a first photolithography step. Note that a resist mask may be formed by an inkjet method. Formation of the resist mask by an inkjet method needs no photomask; thus, manufacturing cost can be reduced.

In this embodiment, a glass substrate is used as the substrate 505 having an insulating surface.

An insulating film which serves as a base film may be provided between the substrate 505 and the gate electrode layer 511. The base film has a function of preventing diffusion of an impurity element (for example, an alkali metal such as Li or Na, or an alkaline earth metal such as Ca) from the substrate 505, and can be formed with a single-layer structure or a stacked-layer structure using one or more of a silicon nitride film, a silicon oxide film, a silicon nitride oxide film, and a silicon oxynitride film.

The gate electrode layer 511 can be formed to have a single-layer or stacked-layer structure using a metal material such as molybdenum, titanium, chromium, tantalum, tungsten, aluminum, copper, neodymium, or scandium, or an alloy material containing any of these materials as its main component. Note that aluminum or copper can also be used as such a metal material if it can withstand the temperature of heat treatment to be performed in a later step. Aluminum or copper is preferably combined with a refractory metal material so as to prevent a heat resistance problem and a corrosive problem. As the refractory metal material, molybdenum, titanium, chromium, tantalum, tungsten, neodymium, scandium, or the like can be used.

Next, a gate insulating layer 507 is formed over the gate electrode layer 511. The gate insulating layer 507 can be formed using a plasma CVD method, a sputtering method, or the like. The gate insulating layer 507 can be formed to have a single-layer structure or a stacked-layer structure using one or more films selected from a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, a tantalum oxide film, a gallium oxide film, and the like.

For the oxide semiconductor in this embodiment, an oxide semiconductor which is made to be an i-type semiconductor or a substantially i-type semiconductor by removing an impurity (a highly purified oxide semiconductor) is used. Such a highly purified oxide semiconductor is highly sensitive to an interface state and interface charge; thus, an interface between the oxide semiconductor layer and the gate insulating layer is important. For that reason, the gate insulating layer that is to be in contact with the highly purified oxide semiconductor needs to have high quality.

For example, a high-density plasma CVD method using microwaves (e.g., a frequency of 2.45 GHz) is preferably employed because an insulating layer can be dense and can have high withstand voltage and high quality. The highly purified oxide semiconductor and the high-quality gate insulating layer are in close contact with each other, whereby the interface state density can be reduced to obtain favorable interface characteristics.

Needless to say, another film formation method such as a sputtering method or a plasma CVD method can be employed as long as the method enables formation of a good-quality insulating layer as a gate insulating layer. Further, an insulating layer whose film quality and characteristics of the interface between the insulating layer and an oxide semiconductor are improved by heat treatment which is performed after formation of the insulating layer may be formed as a gate insulating layer. In any case, any insulating layer may be used as long as the insulating layer has characteristics of enabling reduction in interface state density of the interface between the insulating layer and an oxide semiconductor and formation of a favorable interface as well as having favorable film quality as a gate insulating layer.

The gate insulating layer 507 is to be in contact with an oxide semiconductor layer formed later. Since semiconductor characteristics are impaired when hydrogen diffuses into the oxide semiconductor layer, the gate insulating layer 507 desirably does not contain hydrogen, hydroxyl group, and moisture. In order that hydrogen, hydroxyl group, and moisture are contained as little as possible in the gate insulating layer 507 and an oxide semiconductor film 530, it is preferable that the substrate 505 over which the gate electrode layer 511 is formed or the substrate 505 over which the gate electrode layer 511 and the gate insulating layer 507 are formed be preheated in a preheating chamber of a sputtering apparatus as pretreatment for the formation of the oxide semiconductor film 530 to eliminate and remove impurities such as hydrogen and moisture adsorbed onto the substrate 505. As an evacuation unit provided in the preheating chamber, a cryopump is preferable. Note that this preheating treatment can be omitted. Further, this preheating treatment may be performed in a similar manner on the substrate 505 over which layers up to and including a source electrode layer 515a and a drain electrode layer 515b are formed before formation of an insulating layer 516.

Figure 15A:
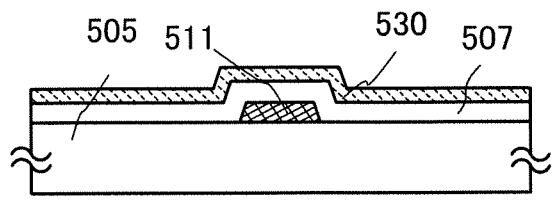
FIGS. 15A to 15E illustrate an example of a transistor including an oxide semiconductor layer and a manufacturing method thereof according to an embodiment.
Figure 15B:
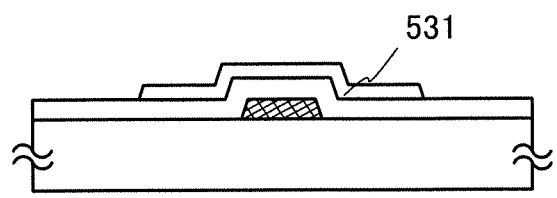

Next, over the gate insulating layer 507, the oxide semiconductor film 530 with a thickness of greater than or equal to 2 nm and less than or equal to 200 nm, preferably greater than or equal to 5 nm and less than or equal to 30 nm is formed (see FIG. 15A). The oxide semiconductor film is formed by a sputtering method using an oxide semiconductor target. When the oxide semiconductor film is formed by a sputtering method, one of an AC sputtering apparatus, a DC sputtering apparatus, and an RF sputtering apparatus is used.

Note that before the oxide semiconductor film 530 is formed by a sputtering method, powdery substances (also referred to as particles or dust) attached to a surface of the gate insulating layer 507 are preferably removed by reverse sputtering in which plasma is generated by introduction of an argon gas. The reverse sputtering refers to a method in which an RF power supply is used for application of voltage to a substrate in an argon atmosphere and plasma is generated in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, the following metal oxide can be used: a four-component metal oxide such as an In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor; an In—O-based oxide semiconductor, a Sn—O-based oxide semiconductor, a Zn—O-based oxide semiconductor, or the like. Further, $SiO_2$ may be contained in the above oxide semiconductor. Here, for example, an In—Ga—Zn—O-based oxide semiconductor means an oxide film containing indium (In), gallium (Ga), and zinc (Zn), and there is no particular limitation on the stoichiometric proportion thereof. The In—Ga—Zn—O-based oxide semiconductor may contain an element other than In, Ga, and Zn. In this embodiment, the oxide semiconductor film 530 is deposited by a sputtering method with the use of an In—Ga—Zn—O-based oxide target. A cross-sectional view of this stage is illustrated in FIG. 15A.

As the target for forming the oxide semiconductor film 530 by a sputtering method, for example, an oxide target having a composition ratio of $In_2O_3:Ga_2O_3:ZnO=1:1:1$ [molar ratio] is used to form an In—Ga—Zn—O film. Without limitation to the material and the component of the target, for example, an oxide target having a composition ratio of $In_2O_3:Ga_2O_3:ZnO=1:1:2$ [molar ratio] may be used.

The filling rate of the oxide target is higher than or equal to 90% and lower than or equal to 100%, preferably, higher than or equal to 95% and lower than or equal to 99.9%. With use of the metal oxide target with high filling rate, a dense oxide semiconductor film can be formed.

It is preferable that a high-purity gas from which impurities such as hydrogen, water, hydroxyl group, or hydride have been removed be used as a sputtering gas used for the formation of the oxide semiconductor film 530. Specifically, a high-purity gas with a dew point of −60° C. or lower is preferable.

The substrate is held in a deposition chamber kept under reduced pressure, and the substrate temperature is set to higher than or equal to 100° C. and lower than or equal to 600° C., preferably higher than or equal to 200° C. and lower than or equal to 400° C. By forming the oxide semiconductor film in a state where the substrate is heated, the concentration of impurities included in the formed oxide semiconductor film can be reduced. In addition, damage by sputtering can be reduced. Then, a sputtering gas from which hydrogen and moisture have been removed is introduced into the deposition chamber while moisture remaining therein is removed, and the oxide semiconductor film 530 is formed over the substrate 505 with the use of the above target. In order to remove moisture remaining in the deposition chamber, an entrapment vacuum pump such as a cryopump, an ion pump, or a titanium sublimation pump is preferably used. Further, an evacuation unit may be a turbo pump provided with a cold trap. In the deposition chamber which is evacuated with the cryopump, a hydrogen atom, a compound containing a hydrogen atom, such as water ($H_2O$), (more preferably, also a compound containing a carbon atom), and the like are removed, whereby the concentration of impurities in the oxide semiconductor film formed in the deposition chamber can be reduced.

The atmosphere for the sputtering may be an atmosphere of a rare gas (typically, argon), an atmosphere of oxygen, or a mixed atmosphere of a rare gas and oxygen.

As an example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current power source is preferably used, in which case powder substances (also referred to as particles or dust) that are generated in deposition can be reduced and the film thickness can be uniform.

Next, the oxide semiconductor film 530 is processed into an island-shaped oxide semiconductor layer in a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

Note that etching of the oxide semiconductor film 530 may be dry etching, wet etching, or both dry etching and wet etching. As an etchant used for wet etching of the oxide semiconductor film 530, for example, a mixed solution of phosphoric acid, acetic acid, and nitric acid, such as ITO07N (produced by Kanto Chemical Co., Inc.) may be used.

Next, the oxide semiconductor layer is subjected to first heat treatment. The oxide semiconductor layer can be dehydrated or dehydrogenated by this first heat treatment. The temperature of the first heat treatment is higher than or equal to 400° C. and lower than or equal to 750° C., or higher or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, water or hydrogen is prevented from entering the oxide semiconductor layer without exposure to the air; thus, an oxide semiconductor layer 531 is obtained (see FIG. 15B).

Further, a heat treatment apparatus used is not limited to an electric furnace, and a device for heating an object to be processed by heat conduction or heat radiation from a heating element such as a resistance heating element may be alternatively used. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high-temperature gas, an inert gas which does not react with an object to be processed by heat treatment, such as nitrogen or a rare gas like argon, is used.

For example, as the first heat treatment, GRTA by which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to be 6N (99.9999%) or higher, more preferably 7N (99.99999%) or higher (that is, the impurity concentration is 1 ppm or lower, preferably 0.1 ppm or lower).

Further, after the oxide semiconductor layer is heated by the first heat treatment, a high-purity oxygen gas, a high-purity $N_2O$ gas, or ultra dry air (the moisture amount is −40° C. or lower, preferably −60° C. or lower by conversion into a dew point where measurement is performed by a dew point meter in a cavity ring down laser spectroscopy (CRDS) system) may be introduced into the same furnace. It is preferable that the oxygen gas and the $N_2O$ gas do not include water, hydrogen, and the like. The purity of the oxygen gas or the $N_2O$ gas which is introduced into the heat treatment apparatus is preferably 6N or higher, more preferably 7N or higher (i.e., the concentration of impurities in the oxygen gas or the $N_2O$ gas is 1 ppm or lower, preferably 0.1 ppm or lower). Oxygen which is a main component of an oxide semiconductor and has been reduced because of the step of removing impurities through the dehydration or the dehydrogenation is supplied by the action of an oxygen gas or an $N_2O$ gas, whereby the purity of the oxide semiconductor layer is increased and the oxide semiconductor layer is made to be electrically i-type (intrinsic).

In addition, the first heat treatment for the oxide semiconductor layer can also be performed on the oxide semiconductor film 530 which has not been processed into the island-shaped oxide semiconductor layer. In that case, the substrate is taken out from the heating apparatus after the first heat treatment, and then a photolithography step is performed.

Note that the first heat treatment may be performed at either of the following timings without limitation to the above-described timing as long as it is performed after the oxide semiconductor layer is formed: after a source electrode layer and a drain electrode layer are formed over the oxide semiconductor layer; and after an insulating layer is formed over the source electrode layer and the drain electrode layer.

In the case where a contact hole is formed in the gate insulating layer 507, the formation of the contact hole may be performed before or after the first heat treatment is performed on the oxide semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness of greater than or equal to 3 nm and less than or equal to 15 nm is formed and then first heat treatment is performed at a temperature higher than or equal to 450° C. and lower than or equal to 850° C., preferably higher than or equal to 550° C. and lower than or equal to 750° C. in an atmosphere of nitrogen, oxygen, a rare gas, or dry air, whereby a first oxide semiconductor film having a crystal region (including platelike crystals) in a region including a surface is formed. Then, a second oxide semiconductor film which is thicker than the first oxide semiconductor film is formed and then second heat treatment is performed at a temperature higher than or equal to 450° C. and lower than or equal to 850° C., preferably higher than or equal to 600° C. and lower than or equal to 700° C., so that crystal growth proceeds upward with the use of the first oxide semiconductor film as a seed of the crystal growth, whereby the whole second oxide semiconductor film is crystallized. In such a manner, the oxide semiconductor layer having a crystal region with a large thickness may be formed.

Next, a conductive film which serves as a source electrode layer and a drain electrode layer (including a wiring formed using the same layer as the source electrode layer and the drain electrode layer) is formed over the gate insulating layer 507 and the oxide semiconductor layer 531. As the conductive film serving as the source electrode layer and the drain electrode layer, for example, a metal film including an element selected from Al, Cr, Cu, Ta, Ti, Mo, and W, a metal nitride film including any of the above elements as its component (e.g., a titanium nitride film, a molybdenum nitride film, or a tungsten nitride film), or the like can be used. A refractory metal film of Ti, Mo, W, or the like or a metal nitride film of any of these elements (a titanium nitride film, a molybdenum nitride film, or a tungsten nitride film) may be stacked on one of or both a lower side and an upper side of a metal film of Al, Cu, or the like.

Figure 15C:
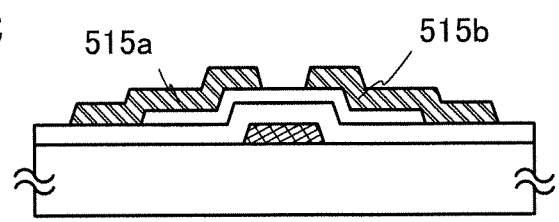

A resist mask is formed over the conductive film in a third photolithography step, and the source electrode layer 515a and the drain electrode layer 515b are formed by selective etching, and then, the resist mask is removed (see FIG. 15C).

Light exposure at the time of the formation of the resist mask in the third photolithography step may be performed using ultraviolet light, KrF laser light, or ArF laser light. A channel length L of a transistor that is formed later is determined by a distance between bottom end portions of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography step may be performed using extreme ultraviolet light having an extremely short wavelength of several nanometers to several tens of nanometers. In the light exposure by extreme ultraviolet light, the resolution is high and the focus depth is large. Accordingly, the channel length L of the transistor to be formed later can be greater than or equal to 10 am and less than or equal to 1000 nm, and the circuit can operate at higher speed.

In order to reduce the number of photomasks used in a photolithography step and reduce the number of photolithography steps, an etching step may be performed with the use of a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that is preferable that etching conditions be optimized so as not to etch and divide the oxide semiconductor layer 531 when the conductive film is etched. However, it is difficult to obtain conditions under which only the conductive film is etched and the oxide semiconductor layer 531 is not etched at all. Therefore, in some cases, only part of the oxide semiconductor layer 531 is etched to be an oxide semiconductor layer having a groove (a recessed portion) at the time of etching of the conductive film.

In this embodiment, since a Ti film is used as the conductive film and an In—Ga—Zn—O-based oxide semiconductor is used for the oxide semiconductor layer 531, an ammonia hydrogen peroxide mixture (a mixed solution of ammonia, water, and a hydrogen peroxide solution) is used as an etchant. When the ammonia hydrogen peroxide mixture is used as an etchant, the conductive film can be selectively etched.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 which serves as a protective insulating film in contact with part of the oxide semiconductor layer is formed without being exposed to air. Plasma treatment may be performed using a mixture gas of oxygen and argon as well.

The insulating layer 516 can be formed to a thickness of at least 1 nm by a method by which impurities such as water and hydrogen do not enter the insulating layer 516, such as a sputtering method, as appropriate. When hydrogen is contained in the insulating layer 516, the hydrogen enters the oxide semiconductor layer or extracts oxygen from the oxide semiconductor layer, which causes a reduction in resistance of a back channel of the oxide semiconductor layer (i.e., makes an n-type back channel), so that a parasitic channel might be formed. Therefore, it is important that a formation method in which hydrogen is not used be employed so that the insulating layer 516 contains hydrogen as little as possible.

In this embodiment, a silicon oxide film is formed to a thickness of 200 nm as the insulating layer 516 by a sputtering method. The substrate temperature in film formation may be higher than or equal to room temperature and lower than or equal to 300° C. and in this embodiment, is 100° C. The silicon oxide film can be formed by a sputtering method in a rare gas (typically, argon) atmosphere, an oxygen atmosphere, or a mixed atmosphere of a rare gas and oxygen. As a target, a silicon oxide target or a silicon target may be used. For example, the silicon oxide film can be formed using a silicon target by a sputtering method in an atmosphere containing oxygen. As the insulating layer 516 which is formed in contact with the oxide semiconductor layer, an inorganic insulating film which does not contain impurities such as moisture, a hydrogen ion, and OH⁻ and blocks the entry of these impurities from the outside is used. Typically, a silicon oxide film, a silicon oxynitride film, an aluminum oxide film, an aluminum oxynitride film, or the like is used.

As in the case of forming the oxide semiconductor film 530, an entrapment vacuum pump (e.g., a cryopump) is preferably used in order to remove moisture remaining in a deposition chamber used for forming the insulating layer 516. The insulating layer 516 is formed in a deposition chamber in which evacuation has been performed with a cryopump, whereby the concentration of impurities in the insulating layer 516 can be reduced. A turbo pump provided with a cold trap may be used as an evacuation unit for removing moisture remaining in the deposition chamber used for forming the insulating layer 516.

It is preferable that a high-purity gas from which impurities such as hydrogen, water, hydroxyl group, or hydride have been removed be used as a sputtering gas for the formation of the insulating layer 516.

Next, second heat treatment is performed in an inert gas atmosphere or an oxygen gas atmosphere (preferably at higher than or equal to 200° C. and lower than or equal to 400° C., for example, higher than or equal to 250° C. and lower than or equal to 350° C.). For example, the second heat treatment is performed in a nitrogen atmosphere at 250° C. for one hour. In the second heat treatment, part of the oxide semiconductor layer (a channel formation region) is heated while being in contact with the insulating layer 516.

As described above, the first heat treatment is performed on the oxide semiconductor film, whereby impurities such as hydrogen, moisture, hydroxyl group, or hydride (also referred to as a hydrogen compound) can be intentionally eliminated from the oxide semiconductor layer and oxygen, which is one of main components of the oxide semiconductor and has been reduced through the step of removing the impurities, can be supplied. Accordingly, the oxide semiconductor layer is made to be a highly purified and electrically i-type (intrinsic) oxide semiconductor.

Figure 15D:
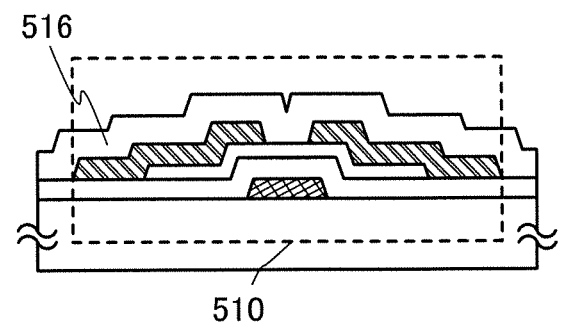
Figure 15E:
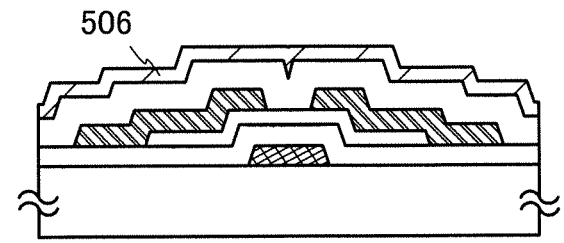

Through the above steps, the transistor 510 is formed (FIG. 15D).

When a silicon oxide layer having a lot of defects is used as the insulating layer 516, heat treatment after formation of the silicon oxide layer has an effect of diffusing impurities such as hydrogen, moisture, a hydroxyl group, or hydride contained in the oxide semiconductor layer to the insulating layer so that the impurities contained in the oxide semiconductor layer can be further reduced.

A protective insulating layer 506 may be formed over the insulating layer 516. For example, a silicon nitride film is formed by an RF sputtering method. Since an RF sputtering method has high productivity, it is preferably used as a film formation method of the protective insulating layer. As the protective insulating layer, an inorganic insulating film which does not contain impurities such as moisture and blocks the entry of the impurities from the outside is used; for example, a silicon nitride film, an aluminum nitride film, or the like is used. It is particularly effective to use a silicon nitride film and an aluminum nitride film as barrier films against hydrogen ions or hydrogen atoms, and either of these is preferably formed over the insulating layer 516. In this embodiment, the protective insulating layer 506 is formed using a silicon nitride film (see FIG. 15E).

In this embodiment, as the protective insulating layer 506, a silicon nitride film is formed by heating the substrate 505 over which layers up to the insulating layer 516 are formed, to a temperature of 100° C. to 400° C., introducing a sputtering gas containing high-purity nitrogen from which hydrogen and moisture are removed, and using a target of silicon semiconductor. In this case, the protective insulating layer 506 is preferably deposited while removing moisture remaining in a treatment chamber, as in the case of the insulating layer 516.

After the formation of the protective insulating layer, heat treatment may be further performed at higher than or equal to 100° C. and lower than or equal to 200° C. for longer than or equal to 1 hour and shorter than or equal to 30 hours in the air. This heat treatment may be performed at a fixed heating temperature. Alternatively, the following change in the heating temperature may be conducted plural times repeatedly: the heating temperature is increased from room temperature to a temperature higher than or equal to 100° C. and lower than or equal to 200° C. and then decreased to room temperature.

A transistor including a highly purified oxide semiconductor layer which is manufactured in accordance with this embodiment as described achieves high filed-effect mobility and thus can operate at high speed. Accordingly, by using the transistor including a highly purified oxide semiconductor layer in a pixel portion of a liquid crystal display device, a high-quality image can be provided. In addition, by using the transistors including a highly purified oxide semiconductor layer, a driver circuit portion and a pixel portion can be formed over one substrate; thus, the number of components of the liquid crystal display device can be reduced.

Measurement results of the field-effect mobility of a transistor including a highly purified oxide semiconductor are described.

Figure 16:
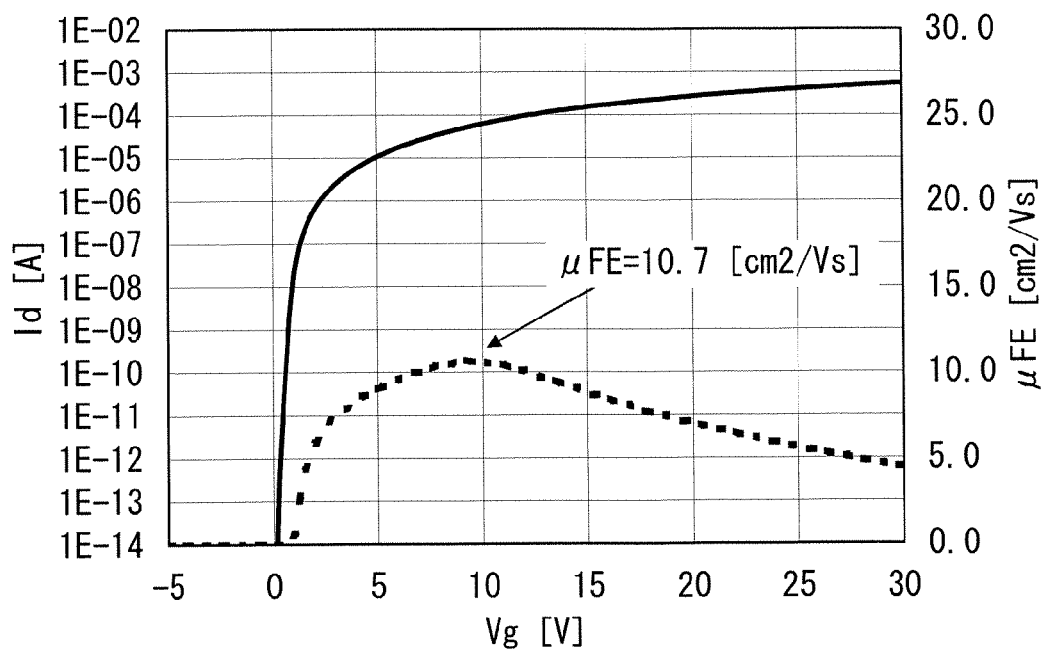
FIG. 16 is a graph showing an example of $V_g$-$I_d$ characteristics of a transistor formed using an oxide semiconductor according to an embodiment.

In accordance with the above manufacturing method of this embodiment, a transistor (L/W=10 μm/50 μm) including a highly purified oxide semiconductor (an In—Ga—Zn—O-based oxide semiconductor film with a thickness of 50 nm) was manufactured, and a change in characteristics of source-drain current (hereinafter, referred to as drain current or $I_d$) was measured under conditions that the substrate temperature was set to room temperature, source-drain voltage (hereinafter, referred to as drain voltage or $V_d$) was set to 10 V, and source-gate voltage (hereinafter, referred to as gate voltage or $V_g$) was changed from −30 V to +30 V. That is, $V_g$-$I_d$ characteristics were measured. Note that in FIG. 16, the range of $V_g$ is from −5 V to +30 V. In FIG. 16, the maximum value of field-effect mobility of the transistor including a highly purified oxide semiconductor layer can be confirmed to be 10.7 cm²/Vsec.

When the transistor including a highly purified oxide semiconductor layer is used, the current value in an off state (an off-state current value) can be further reduced. Accordingly, an electric signal such as an image signal can be held for a longer period and a writing interval can be set longer. By using the method in Embodiment 4, the frequency of refresh operation can be reduced, which leads to a higher effect of suppressing power consumption.

In addition, measurement results of the off-state current of a transistor including a highly purified oxide semiconductor are described. In FIG. 16, current was measured using an ordinary current measurement apparatus; however, the current was smaller than or equal to the lower limit of measurement in many cases in a range where $V_g$ is negative, and thus accurate measurement of the off-state current was difficult. Therefore, attempt was made to measure the off-state current more accurately.

Figure 17:
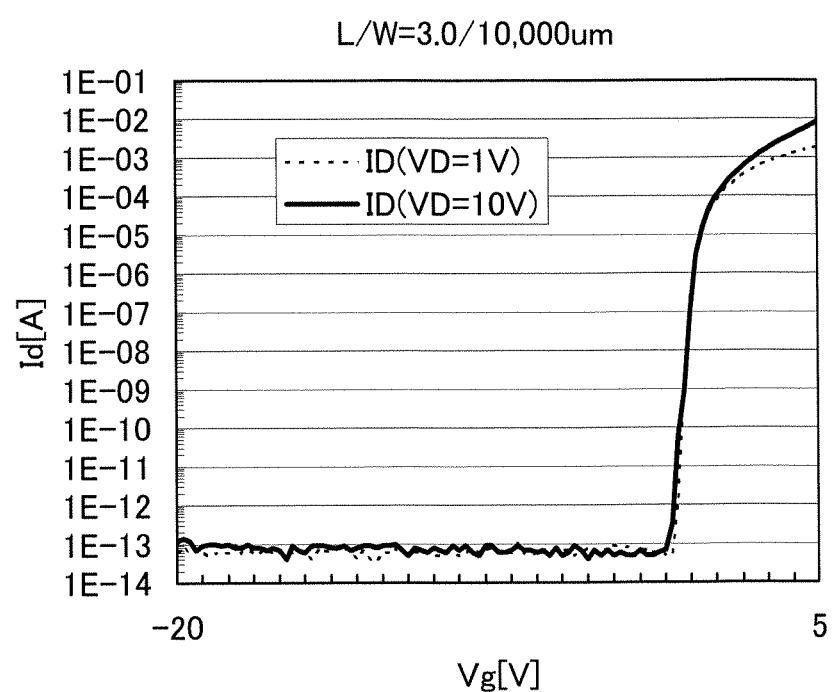
FIG. 17 is a graph for showing characteristics of $V_g$-$I_d$ characteristics in an off state of a transistor formed using an oxide semiconductor according to an embodiment.

In accordance with the above manufacturing method of this embodiment, a transistor including a highly purified oxide semiconductor was manufactured. First, a transistor with a sufficiently large channel width W of 1 cm was prepared in consideration of the very small off-state current of the transistor including a highly purified oxide semiconductor, and the off-state current was measured. FIG. 17 shows the measurement results of the off-state current of the transistor with a channel width W of 1 cm. In FIG. 17, the horizontal axis represents a gate voltage $V_g$, and the vertical axis represents a drain current $I_d$. In the case where the drain voltage $V_D$ is +1 V or +10 V and the gate voltage $V_g$ is within the range of −5 V to −20 V, the off-state current of the transistor was found to be smaller than or equal to $1 \times 10^{-13}$ A, which is the detection limit. Moreover, it was found that the off-state current of the transistor (per unit channel width (1 μm) here) was smaller than or equal to 10 aA/μm ($1 \times 10^{-17}$ A/μm).

Described next are the results obtained by more accurately measuring the off-state current of the transistor including a highly purified oxide semiconductor. As described above, the off-state current of the transistor including a highly purified oxide semiconductor was found to be smaller than or equal to $1 \times 10^{-13}$ A which is the detection limit of measurement equipment. Here, the results obtained by measuring more accurate off-state current (the value smaller than or equal to the detection limit of measurement equipment in the above measurement), with the use of an element for characteristic evaluation, will be described.

The element for characteristic evaluation used in the current measurement is described below.

As the element for characteristic evaluation, three measurement systems which are connected in parallel are used. Each measurement system includes a capacitor 700, a first transistor 701, a second transistor 702, a third transistor 703, and a fourth transistor 704. The first transistor 701, the second transistor 702, the third transistor 703, and the fourth transistor 704 were manufactured according to this embodiment, and the structures of the transistors were the same as the structure of the transistor 510 illustrated in FIG. 15D.

Figure 20:
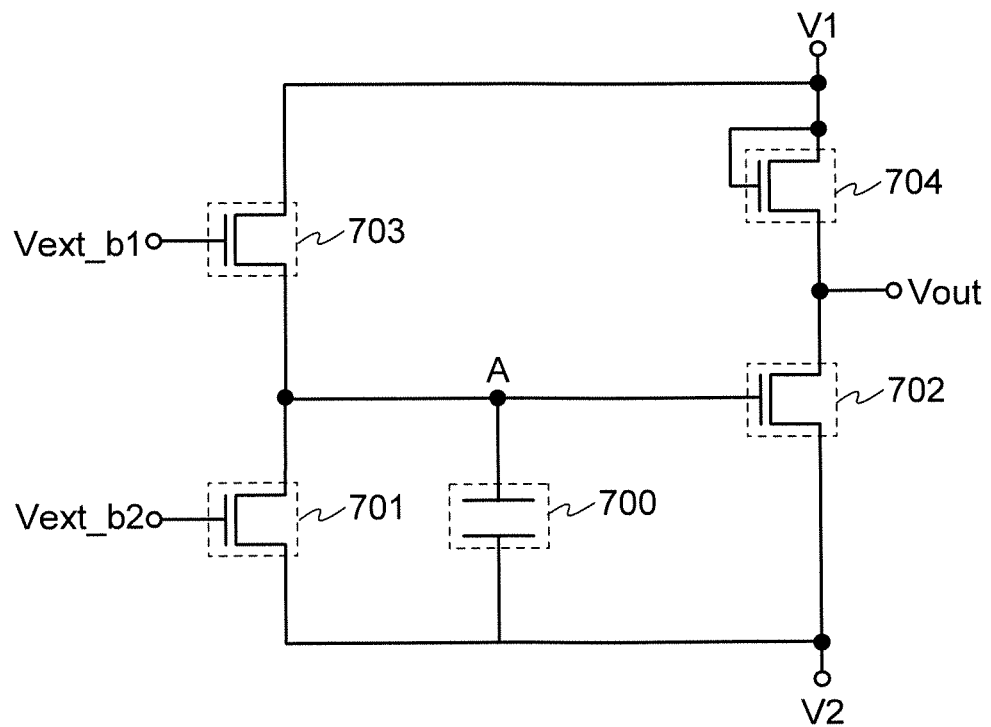
FIG. 20 is a circuit diagram illustrating a measurement system according to an embodiment.

A circuit diagram of one measurement system is illustrated in FIG. 20. In each measurement system, one of a source terminal and a drain terminal of the first transistor 701, one of terminals of the capacitor 700, and one of a source terminal and a drain terminal of the second transistor 702 are connected to a power supply (a power supply for supplying V2). The other of the source terminal and the drain terminal of the first transistor 701, one of a source terminal and a drain terminal of the third transistor 703, the other of the terminals of the capacitor 700, and a gate terminal of the second transistor 702 are connected to one another. The other of the source terminal and the drain terminal of the third transistor 703, one of a source terminal and a drain terminal of the fourth transistor 704, and a gate terminal of the fourth transistor 704 are connected to a power supply (a power supply for supplying V1). The other of the source terminal and the drain terminal of the second transistor 702, and the other of the source terminal and the drain terminal of the fourth transistor 704 are connected to each other and serve as an output terminal Vout.

A potential $V_{ext\_b2}$ for controlling whether to turn on or off the first transistor 701 is supplied to the gate terminal of the first transistor 701. A potential $V_{ext\_b1}$ for controlling whether to turn on or off the third transistor 703 is supplied to the gate terminal of the third transistor 703. A potential $V_{out}$ is output from the output terminal.

Then, the measurement of the off-state current with use of the above measurement systems is described.

When a potential difference is applied in an initialization period in order to measure the off-state current and the measurement period is started, the potential of the gate terminal of the second transistor 702 varies as time passes. Accordingly, potential of the output potential $V_{out}$ of the output terminal varies over time. The off-state current can be calculated with the thus obtained output potential $V_{out}$.

Each of the first transistor 701, the second transistor 702, the third transistor 703, and the fourth transistor 704 is a transistor including a highly purified oxide semiconductor with a channel length L of 10 μm and a channel width W of 50 μm. In the three measurement systems arranged in parallel, the capacitance value of the capacitor in the first measurement system was 100 fF, the capacitance value of the capacitor in the second measurement system was 1 pF, and the capacitance value of the capacitor in the third measurement system was 3 pF.

Note that $V_{DD}$ was 5 V and $V_{SS}$ was 0 V in the measurement of the off-state current. In the measurement period, the potential V1 was basically set to VSS and set to VDD only in a period of 100 msec every 10 to 300 seconds, and $V_{out}$ was measured.

Figure 18:
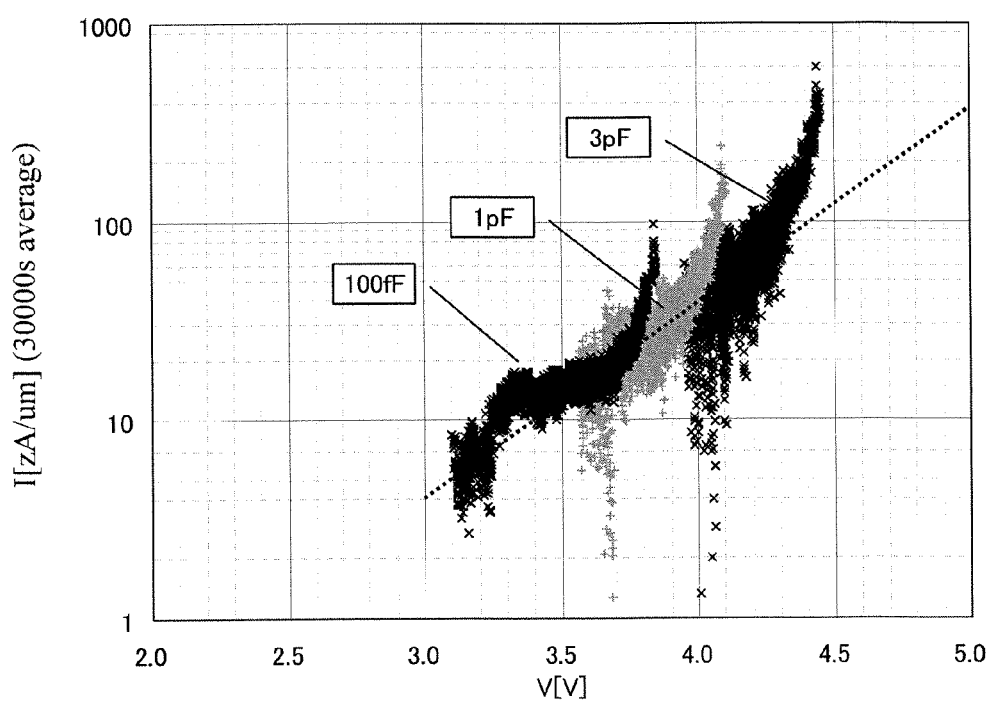
FIG. 18 is a graph showing a relation between source-drain voltage V and off-state current I.

FIG. 18 shows the off-state current calculated based on the above current measurement. In FIG. 18, the relationship between source-drain voltage V and off-state current I is shown. According to FIG. 18, the off state current was about 40 zA/μm under the condition where the source-drain voltage was 4 V. In addition, the off-state current was smaller than or equal to 10 zA/μm under the condition where the source-drain voltage was 3.1 V. Note that 1 zA represents $10^{-21}$ A.

According to this embodiment, it was confirmed that the off-state current can be sufficiently small in a transistor including a highly purified oxide semiconductor.

Embodiment 6

In this embodiment, an example of an electronic device including the liquid crystal display device described in any of the above embodiments will be described.

Figure 19A:
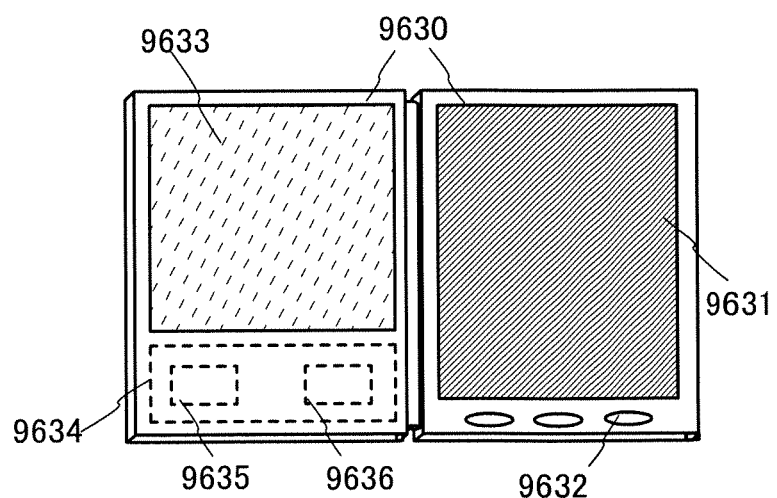
FIGS. 19A and 19B illustrate an example of an electronic device mounted with a display device according to an embodiment.

FIG. 19A illustrates an electronic book reader (also referred to as an e-book reader) which can include housings 9630, a display portion 9631, operation keys 9632, a solar battery 9633, and a charge and discharge control circuit 9634. The electronic book reader is provided with the solar battery 9633 and a display panel so that the solar battery 9633 and the display panel can be opened and closed freely. In the electronic book reader, power from the solar battery is supplied to the display panel or a video signal processing portion. The electronic book reader illustrated in FIG. 19A can have a function of displaying various kinds of information (e.g., a still image, a moving image, and a text image), a function of displaying a calendar, a date, the time, or the like on the display portion, a touch-input function of operating or editing the information displayed on the display portion by touch input, a function of controlling processing by various kinds of software (programs), and the like. In FIG. 19A, a structure including a battery 9635 and a DCDC converter (hereinafter abbreviated as a converter 9636) is illustrated as an example of the charge and discharge control circuit 9634.

The display portion 9631 is a reflective liquid crystal display device having a touch-input function with the use of photo sensors and is used in a comparatively bright environment. Therefore, the structure illustrated in FIG. 19A is preferable because power generation by the solar battery 9633 and charge in the battery 9635 can be performed effectively. Note that a structure in which the solar battery 9633 is provided on each of a surface and a rear surface of the housing 9630 is preferable in order to charge the battery 9635 efficiently. When a lithium ion battery is used as the battery 9635, there is an advantage of downsizing or the like.

Figure 19B:
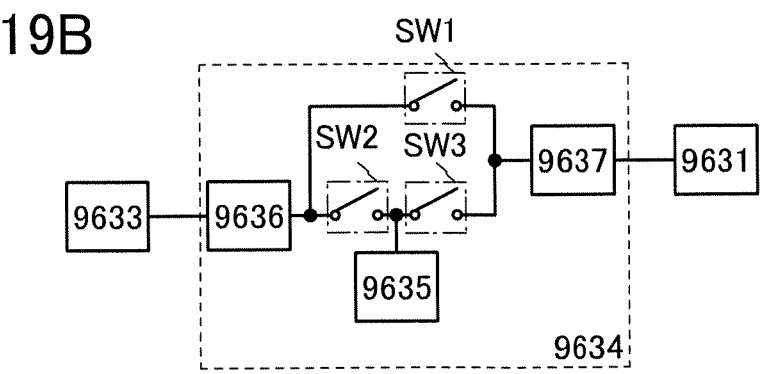

The structure and the operation of the charge and discharge control circuit 9634 illustrated in FIG. 19A will be described with reference to a block diagram in FIG. 19B. The solar battery 9633, the battery 9635, the converter 9636, a converter 9637, switches SW1 to SW3, and the display portion 9631 are shown in FIG. 19B, and the battery 9635, the converter 9636, the converter 9637, and the switches SW1 to SW3 correspond to the charge and discharge control circuit 9634.

First, an example of operation in the case where power is generated by the solar battery 9633 using external light is described. The voltage of power generated by the solar battery is raised or lowered by the converter 9636 so that the power has a voltage for charging the battery 9635. Then, when the power from the solar battery 9633 is used for the operation of the display portion 9631, the switch SW1 is turned on and the voltage of the power is raised or lowered by the converter 9637 to be voltage needed for the display portion 9631. In addition, when display on the display portion 9631 is not performed, the switch SW1 is turned off and the switch SW2 is turned on so that charge of the battery 9635 may be performed.

Note that although the solar battery 9633 is described as an example of a means for charge, charge of the battery 9635 may be performed with another means. In addition, a combination of the solar battery 9633 and another means for charge may be used.

This embodiment can be implemented in appropriate combination with the structures described in the other embodiments.

This application is based on Japanese Patent Application serial no. 2010-035266 filed with Japan Patent Office on Feb. 19, 2010, the entire contents of which are hereby incorporated by reference.

What is claimed is:

1. A liquid crystal display device comprising:
a first anisotropic light-condensing means over a substrate;
a second anisotropic light-condensing means over the substrate;
a transistor comprising a semiconductor layer between the first anisotropic light-condensing means and the second anisotropic light-condensing means, wherein the semiconductor layer does not overlap with the first anisotropic light-condensing means or the second anisotropic light-condensing means;
a planarization layer over the transistor;
a color filter over and in contact with a top surface and part of side surfaces of one of the first anisotropic light-condensing means and the second anisotropic light-condensing means; and
a pixel electrode connected to the transistor,
wherein the pixel electrode includes a first region and a second region,
wherein the first region is light reflective and the second region transmits visible light, and
wherein the second region overlaps with the color filter, the first anisotropic light-condensing means, and the second anisotropic light-condensing means.

2. The liquid crystal display device according to claim 1, wherein each of the first anisotropic light-condensing means and the second anisotropic light-condensing means is a lenticular lens.

3. The liquid crystal display device according to claim 1, wherein each of the first anisotropic light-condensing means and the second anisotropic light-condensing means has a condensing direction X and a non-condensing direction Y.

4. The liquid crystal display device according to claim 3, wherein the non-condensing direction Y of each of the first anisotropic light-condensing means and the second anisotropic light-condensing means corresponds to a longitudinal direction of each of the first anisotropic light-condensing means and the second anisotropic light-condensing means.

5. The liquid crystal display device according to claim 1, further comprising a black matrix overlapping with a boundary between the first region and the second region.

6. A liquid crystal display device comprising:
a first anisotropic light-condensing means over a substrate;
a second anisotropic light-condensing means over the substrate;
a transistor comprising a semiconductor layer between the first anisotropic light-condensing means and the second anisotropic light-condensing means, wherein the semiconductor layer does not overlap with the first anisotropic light-condensing means or the second anisotropic light-condensing means;
a first insulating layer over the transistor;
a color filter over and in contact with a top surface and part of side surfaces of one of the first anisotropic light-condensing means and the second anisotropic light-condensing means;
a second insulating layer over the color filter; and
a pixel electrode connected to the transistor,
wherein the pixel electrode includes a first region and a second region,
wherein the first region is light reflective and the second region transmits visible light,
wherein the second region overlaps with the color filter, the first anisotropic light-condensing means, and the second anisotropic light-condensing means, and
wherein a thickness of the second insulating layer overlapped with the second region is smaller than a thickness of the second insulating layer overlapped with the first region.

7. The liquid crystal display device according to claim 6, wherein each of the first anisotropic light-condensing means and the second anisotropic light-condensing means is a lenticular lens.

8. The liquid crystal display device according to claim 6, wherein each of the first anisotropic light-condensing means and the second anisotropic light-condensing means has a condensing direction X and a non-condensing direction Y.

9. The liquid crystal display device according to claim 8, wherein the non-condensing direction Y of each of the first anisotropic light-condensing means and the second anisotropic light-condensing means corresponds to a longitudinal direction of each of the first anisotropic light-condensing means and the second anisotropic light-condensing means.

10. The liquid crystal display device according to claim 6, wherein the first insulating layer is a planarization layer.

11. The liquid crystal display device according to claim 6, further comprising a black matrix overlapping with a boundary between the first region and the second region.

12. A liquid crystal display device comprising:
a first anisotropic light-condensing means over a substrate;
a second anisotropic light-condensing means over the substrate;
reflective layers on side surfaces of the first anisotropic light-condensing means and the second anisotropic light-condensing means;
a transistor comprising a semiconductor layer between adjacent reflective layers;
a planarization layer over the transistor;

a color filter over and in contact with a top surface and part of side surfaces of one of the first anisotropic light-condensing means and the second anisotropic light-condensing means; and a pixel electrode connected to the transistor, wherein the pixel electrode includes a first region and a second region, wherein the first region is light reflective and the second region transmits visible light, wherein the second region overlaps with the color filter, the first anisotropic light-condensing means and the second anisotropic light-condensing means, and wherein a top surface of the planarization layer and a top surface of the reflective layers are aligned with each other.

13. The liquid crystal display device according to claim 12, wherein each of the first anisotropic light-condensing means and the second anisotropic light-condensing means is a lenticular lens.

14. The liquid crystal display device according to claim 12, wherein each of the first anisotropic light-condensing means and the second anisotropic light-condensing means has a condensing direction X and a non-condensing direction Y.

15. The liquid crystal display device according to claim 14, wherein the non-condensing direction Y of each of the first anisotropic light-condensing means and the second anisotropic light-condensing means corresponds to a longitudinal direction of each of the first anisotropic light-condensing means and the second anisotropic light-condensing means.

16. The liquid crystal display device according to claim 12, further comprising a black matrix overlapping with a boundary between the first region and the second region.

\* \* \* \* \*